(12) United States Patent
Hing et al.

(10) Patent No.: US 9,310,598 B2
(45) Date of Patent: Apr. 12, 2016

(54) AUTOFOCUS METHOD AND AUTOFOCUS DEVICE

(75) Inventors: Paul Hing, Owingen-Billafingen (DE); Sven Hensler, Gaienhofen (DE)

(73) Assignee: SAKURA FINETEK U.S.A., INC., Torrance, CA (US)

( * ) Notice: Subject to any disclaimer, the term of this patent is extended or adjusted under 35 U.S.C. 154(b) by 1140 days.

(21) Appl. No.: 13/255,827

(22) PCT Filed: Mar. 11, 2010

(86) PCT No.: PCT/IB2010/000518
§ 371 (c)(1),
(2), (4) Date: Oct. 24, 2011

(87) PCT Pub. No.: WO2010/103389
PCT Pub. Date: Sep. 16, 2010

(65) Prior Publication Data
US 2012/0038979 A1 Feb. 16, 2012

(30) Foreign Application Priority Data

Mar. 11, 2009 (DE) .......................... 10 2009 012 292
Mar. 11, 2009 (DE) .......................... 10 2009 012 293

(51) Int. Cl.
*G02B 21/00* (2006.01)
*G02B 21/24* (2006.01)
(52) U.S. Cl.
CPC .................................... *G02B 21/247* (2013.01)
(58) Field of Classification Search
CPC .. G02B 21/247; G02B 21/245; G02B 21/241; G02B 7/28; G02B 7/285
See application file for complete search history.

(56) References Cited

U.S. PATENT DOCUMENTS

| 3,309,262 A | 3/1967 | Copeland et al. |
| 3,525,803 A | 8/1970 | Smart |
| 3,765,851 A | 10/1973 | White |
| 3,862,909 A | 1/1975 | Copeland |

(Continued)

FOREIGN PATENT DOCUMENTS

| DE | 102009012293 | 3/2009 |
| EP | 1447699 | 8/2004 |

(Continued)

OTHER PUBLICATIONS

Sakura Finetek, EPO Office Action mailed Jul. 30, 2013 for EPO App No. 10719379.9, 8 pages.

(Continued)

*Primary Examiner* — John Lee
(74) *Attorney, Agent, or Firm* — Blakely Sokoloff Taylor & Zafman LLP

(57) ABSTRACT

The invention is based on an autofocus method in which light from a light source (12) is focused at a measurement light focus (52) in a sample (6) and is reflected from there and the reflected light is guided through an optical system (22) in two light paths (48, 50) onto at least two detector elements (72, 74). In order to achieve fast and accurate automatic focusing on the sample, it is proposed that the measurement light focus (52) is moved in layers of the sample (6) which reflect light to different extents, and the detector elements (72, 74) are arranged in such a way that, in this case, profiles of a radiation property registered by the detector elements (72, 74) are different and a focus position is set in a manner dependent on the profiles.

20 Claims, 8 Drawing Sheets

(56) References Cited

U.S. PATENT DOCUMENTS

Figure 1:
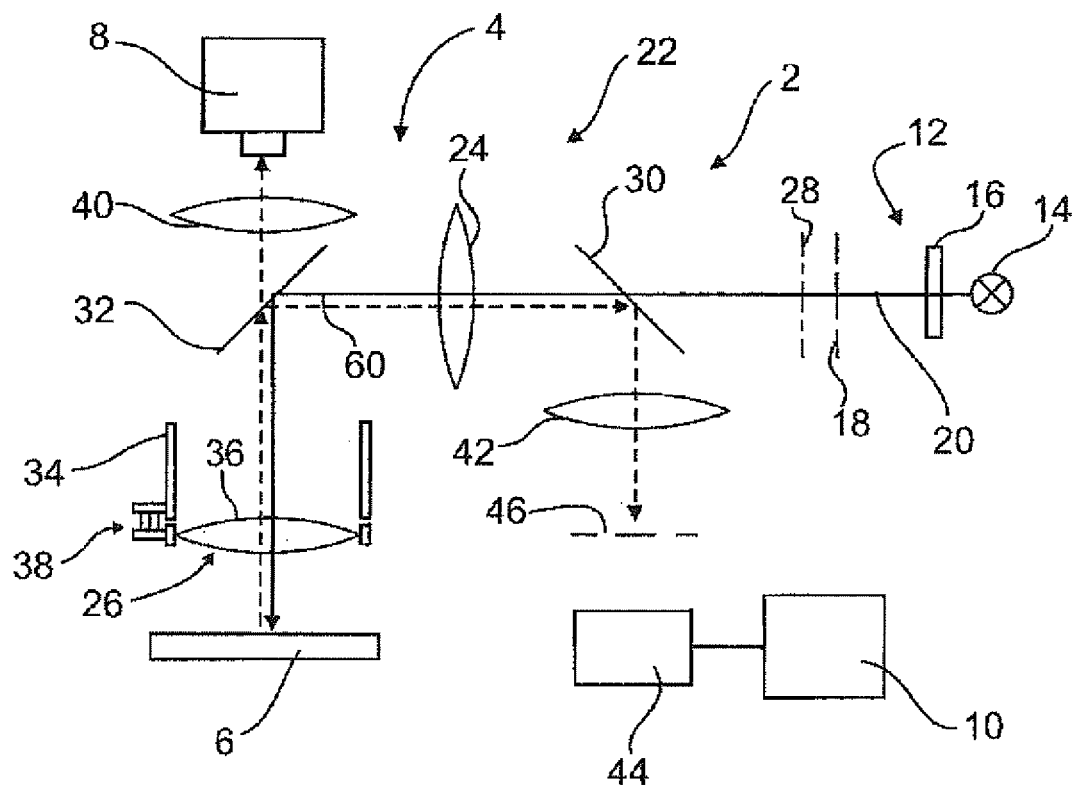

| | | | |
|---|---|---|---|
| 4,000,417 A | 12/1976 | Adkisson et al. | |
| 4,079,248 A | 3/1978 | Lehureau et al. | |
| 4,148,752 A | 4/1979 | Burger et al. | |
| 4,404,683 A | 9/1983 | Kobayashi et al. | |
| 4,477,185 A * | 10/1984 | Berger et al. | 356/152.2 |
| 4,595,829 A * | 6/1986 | Neumann et al. | 250/201.4 |
| 4,684,799 A | 8/1987 | Emoto et al. | |
| 4,737,022 A * | 4/1988 | Faltermeier et al. | 359/387 |
| 4,760,385 A | 7/1988 | Jansson et al. | |
| 4,958,920 A * | 9/1990 | Jorgens et al. | 359/392 |
| 4,962,264 A | 10/1990 | Forester | |
| 5,287,272 A | 2/1994 | Rutenberg et al. | |
| 5,297,034 A | 3/1994 | Weinstien | |
| 5,297,215 A | 3/1994 | Yamagishi | |
| 5,367,401 A | 11/1994 | Saulietis | |
| 5,428,690 A | 6/1995 | Bacus et al. | |
| 5,473,706 A | 12/1995 | Bacus et al. | |
| 5,530,237 A * | 6/1996 | Sato et al. | 250/201.4 |
| 5,546,323 A | 8/1996 | Bacus et al. | |
| 5,561,556 A | 10/1996 | Weissman et al. | |
| 5,659,174 A | 8/1997 | Kaneoka et al. | |
| 5,675,141 A | 10/1997 | Kukihara | |
| 5,696,589 A * | 12/1997 | Bernacki | 356/630 |
| 5,737,084 A * | 4/1998 | Ishihara | 356/609 |
| 5,793,969 A | 8/1998 | Kamentsky et al. | |
| 5,836,877 A | 11/1998 | Zavislan | |
| 5,864,138 A | 1/1999 | Miyata et al. | |
| 5,891,619 A | 4/1999 | Zakim et al. | |
| 5,924,074 A | 7/1999 | Evans | |
| 6,008,892 A * | 12/1999 | Kain et al. | 356/246 |
| 6,031,930 A | 2/2000 | Bacus et al. | |
| 6,043,475 A * | 3/2000 | Shimada et al. | 250/201.3 |
| 6,061,176 A | 5/2000 | Shih | |
| 6,078,681 A | 6/2000 | Silver | |
| 6,091,075 A * | 7/2000 | Shibata et al. | 250/559.44 |
| 6,091,842 A | 7/2000 | Domanik et al. | |
| 6,101,265 A | 8/2000 | Bacus et al. | |
| 6,130,745 A * | 10/2000 | Manian et al. | 356/123 |
| 6,147,797 A | 11/2000 | Lee | |
| 6,205,235 B1 | 3/2001 | Roberts | |
| 6,208,374 B1 | 3/2001 | Clinch | |
| 6,215,892 B1 | 4/2001 | Douglass et al. | |
| 6,226,352 B1 | 5/2001 | Salb | |
| 6,226,392 B1 | 5/2001 | Bacus et al. | |
| 6,248,995 B1 | 6/2001 | Tanaami et al. | |
| 6,272,235 B1 | 8/2001 | Bacus et al. | |
| 6,396,941 B1 | 5/2002 | Bacus et al. | |
| 6,404,906 B2 | 6/2002 | Bacus et al. | |
| 6,466,690 B2 | 10/2002 | Bacus et al. | |
| 6,522,774 B1 | 2/2003 | Bacus et al. | |
| 6,529,271 B1 | 3/2003 | Engelhardt | |
| 6,606,413 B1 | 8/2003 | Zeineh | |
| 6,671,393 B2 | 12/2003 | Hays et al. | |
| 6,674,881 B2 | 1/2004 | Bacus et al. | |
| 6,674,884 B2 | 1/2004 | Bacus et al. | |
| 6,678,398 B2 | 1/2004 | Wolters et al. | |
| 6,684,092 B2 | 1/2004 | Zavislan | |
| 6,711,283 B1 | 3/2004 | Soenksen | |
| 6,735,531 B2 | 5/2004 | Rhett et al. | |
| 6,775,402 B2 | 8/2004 | Bacus et al. | |
| 6,800,249 B2 | 10/2004 | de la Torre-Bueno | |
| 6,800,853 B2 | 10/2004 | Ohkura | |
| 6,812,446 B2 * | 11/2004 | Kreh | 250/201.3 |
| 6,834,237 B2 | 12/2004 | Noergaard et al. | |
| 6,838,650 B1 * | 1/2005 | Toh | 250/201.3 |
| 6,847,481 B1 | 1/2005 | Ludl et al. | |
| 6,847,729 B1 | 1/2005 | Clinch et al. | |
| 6,982,741 B2 | 1/2006 | Fiedler | |
| 6,993,169 B2 | 1/2006 | Wetzel et al. | |
| 7,016,109 B2 | 3/2006 | Nakagawa | |
| 7,027,627 B2 | 4/2006 | Levin et al. | |
| 7,031,507 B2 | 4/2006 | Bacus et al. | |
| 7,071,969 B1 | 7/2006 | Stimson | |
| 7,110,586 B2 | 9/2006 | Bacus et al. | |
| 7,110,645 B2 | 9/2006 | Birk et al. | |
| 7,133,545 B2 | 11/2006 | Douglass et al. | |
| 7,136,518 B2 | 11/2006 | Griffin et al. | |
| 7,141,802 B2 | 11/2006 | Takeyama et al. | |
| 7,146,372 B2 | 12/2006 | Bacus et al. | |
| 7,149,332 B2 | 12/2006 | Bacus et al. | |
| 7,171,030 B2 | 1/2007 | Foran et al. | |
| 7,194,118 B1 | 3/2007 | Harris et al. | |
| 7,196,300 B2 * | 3/2007 | Watkins et al. | 250/201.2 |
| 7,209,287 B2 * | 4/2007 | Lauer | 359/368 |
| 7,212,660 B2 | 5/2007 | Wetzel et al. | |
| 7,224,839 B2 | 5/2007 | Zeineh | |
| 7,233,340 B2 | 6/2007 | Hughes et al. | |
| 7,248,403 B2 | 7/2007 | Nakagawa | |
| 7,250,963 B2 | 7/2007 | Yuri et al. | |
| 7,292,251 B1 | 11/2007 | Gu | |
| 7,297,910 B2 * | 11/2007 | Fomitchov | 250/201.2 |
| 7,301,133 B2 * | 11/2007 | Weiss | 250/201.3 |
| 7,349,482 B2 | 3/2008 | Kim | |
| 7,359,548 B2 | 4/2008 | Douglass et al. | |
| 7,391,894 B2 | 6/2008 | Zeineh | |
| 7,394,482 B2 | 7/2008 | Olschewski | |
| 7,394,979 B2 | 7/2008 | Luther et al. | |
| 7,400,342 B2 | 7/2008 | Gaida et al. | |
| 7,400,983 B2 | 7/2008 | Feingold et al. | |
| 7,406,215 B2 | 7/2008 | Clune et al. | |
| 7,421,102 B2 | 9/2008 | Wetzel et al. | |
| 7,426,345 B2 | 9/2008 | Takamatsu et al. | |
| 7,428,325 B2 | 9/2008 | Douglass et al. | |
| 7,433,026 B2 | 10/2008 | Wolpert et al. | |
| 7,456,377 B2 | 11/2008 | Zeineh et al. | |
| 7,463,761 B2 | 12/2008 | Eichhorn et al. | |
| 7,482,600 B2 | 1/2009 | Seyfried | |
| 7,483,554 B2 | 1/2009 | Kotsianti et al. | |
| 7,486,329 B2 | 2/2009 | Endo | |
| 7,502,519 B2 | 3/2009 | Eichhorn et al. | |
| 7,542,596 B2 | 6/2009 | Bacus et al. | |
| 7,550,699 B1 * | 6/2009 | Marshall | 250/201.4 |
| 7,584,019 B2 | 9/2009 | Feingold et al. | |
| 7,596,249 B2 | 9/2009 | Bacus et al. | |
| 7,602,524 B2 | 10/2009 | Eichhorn et al. | |
| 7,623,697 B1 | 11/2009 | Hughes et al. | |
| 7,630,113 B2 | 12/2009 | Sase et al. | |
| 7,633,616 B2 | 12/2009 | Hing | |
| 7,642,093 B2 | 1/2010 | Tseung et al. | |
| 7,653,300 B2 | 1/2010 | Fujiyoshi et al. | |
| 7,663,078 B2 | 2/2010 | Virag et al. | |
| 7,689,024 B2 | 3/2010 | Eichhorn et al. | |
| 7,738,688 B2 | 6/2010 | Eichhorn et al. | |
| 7,756,309 B2 | 7/2010 | Gholap et al. | |
| 7,756,357 B2 | 7/2010 | Yoneyama | |
| 7,778,485 B2 | 8/2010 | Zeineh et al. | |
| 7,822,257 B2 | 10/2010 | Endo et al. | |
| 7,856,131 B2 | 12/2010 | Bacus et al. | |
| 7,860,292 B2 | 12/2010 | Eichhorn et al. | |
| 7,864,414 B2 | 1/2011 | Sase et al. | |
| 7,869,641 B2 | 1/2011 | Wetzel et al. | |
| 7,873,193 B2 | 1/2011 | De La Torre-Bueno et al. | |
| 7,876,948 B2 | 1/2011 | Wetzel et al. | |
| 7,901,941 B2 | 3/2011 | Tseung et al. | |
| 7,912,267 B2 | 3/2011 | Kawano et al. | |
| 7,916,916 B2 | 3/2011 | Zeineh | |
| 7,920,163 B1 | 4/2011 | Kossin | |
| 7,925,067 B2 | 4/2011 | Bacus et al. | |
| 7,944,608 B2 | 5/2011 | Hayashi et al. | |
| 7,949,161 B2 | 5/2011 | Kawanabe et al. | |
| 7,957,057 B2 | 6/2011 | Sase et al. | |
| 7,967,057 B2 | 6/2011 | Kunii et al. | |
| 7,978,894 B2 | 7/2011 | Soenksen et al. | |
| 8,000,560 B2 | 8/2011 | Shirota | |
| 8,000,562 B2 | 8/2011 | Morales et al. | |
| 8,036,868 B2 | 10/2011 | Zeineh et al. | |
| 8,077,959 B2 | 12/2011 | Dekel et al. | |
| 8,085,296 B2 | 12/2011 | Yuguchi et al. | |
| 8,094,902 B2 | 1/2012 | Crandall et al. | |
| 8,094,914 B2 | 1/2012 | Iki et al. | |
| 8,098,279 B2 | 1/2012 | Sase et al. | |
| 8,098,956 B2 | 1/2012 | Tatke et al. | |
| 8,103,082 B2 | 1/2012 | Olson et al. | |
| 8,125,534 B2 | 2/2012 | Shimonaka | |

(56) References Cited

U.S. PATENT DOCUMENTS

| | | | |
|---|---|---|---|
| 8,159,547 B2 | 4/2012 | Kawashima | |
| 8,174,763 B2 | 5/2012 | Guiney et al. | |
| 8,199,358 B2 | 6/2012 | Eichhorn et al. | |
| 8,203,575 B2 | 6/2012 | Molnar et al. | |
| 8,283,176 B2 | 10/2012 | Bland et al. | |
| 8,304,704 B2* | 11/2012 | Hing et al. | 250/201.3 |
| 8,305,434 B2 | 11/2012 | Nakatsuka et al. | |
| 8,306,298 B2 | 11/2012 | Bacus et al. | |
| 8,306,300 B2 | 11/2012 | Bacus et al. | |
| 8,339,703 B2 | 12/2012 | Knebel | |
| 8,350,904 B2 | 1/2013 | Fujimoto et al. | |
| 8,385,619 B2 | 2/2013 | Soenksen | |
| 8,385,686 B2 | 2/2013 | Sano | |
| 8,394,635 B2 | 3/2013 | Key et al. | |
| 8,396,669 B2 | 3/2013 | Cocks | |
| 8,473,035 B2 | 6/2013 | Frangioni | |
| 8,565,480 B2 | 10/2013 | Eichhorn et al. | |
| 8,565,503 B2 | 10/2013 | Eichhorn et al. | |
| 8,582,489 B2 | 11/2013 | Kim et al. | |
| 8,673,642 B2 | 3/2014 | Key et al. | |
| 8,725,237 B2 | 5/2014 | Bryant-Greenwood et al. | |
| 8,730,315 B2 | 5/2014 | Yoneyama | |
| 8,744,213 B2 | 6/2014 | Tatke et al. | |
| 8,788,217 B2 | 7/2014 | Feingold et al. | |
| 8,923,597 B2 | 12/2014 | Eichhorn et al. | |
| 2001/0035752 A1 | 11/2001 | Kormos et al. | |
| 2002/0169512 A1 | 11/2002 | Stewart | |
| 2002/0176160 A1 | 11/2002 | Suzuki et al. | |
| 2002/0176161 A1 | 11/2002 | Yoneyama et al. | |
| 2003/0098921 A1* | 5/2003 | Endo | 348/345 |
| 2003/0112330 A1 | 6/2003 | Yuri et al. | |
| 2003/0112504 A1* | 6/2003 | Czarnetzki et al. | 359/383 |
| 2003/0133009 A1 | 7/2003 | Brown | |
| 2003/0156276 A1 | 8/2003 | Bowes | |
| 2004/0021936 A1* | 2/2004 | Czarnetzki et al. | 359/368 |
| 2004/0027462 A1 | 2/2004 | Hing | |
| 2004/0090667 A1* | 5/2004 | Gartner et al. | 359/368 |
| 2004/0113043 A1* | 6/2004 | Ishikawa et al. | 250/201.4 |
| 2004/0129858 A1* | 7/2004 | Czarnetzki et al. | 250/201.2 |
| 2004/0135061 A1* | 7/2004 | Kreh | 250/201.3 |
| 2005/0057812 A1* | 3/2005 | Raber | 359/619 |
| 2005/0073649 A1 | 4/2005 | Spector | |
| 2005/0094262 A1 | 5/2005 | Spediacci et al. | |
| 2005/0112537 A1 | 5/2005 | Wu | |
| 2005/0219688 A1 | 10/2005 | Kawano et al. | |
| 2005/0258335 A1* | 11/2005 | Oshiro et al. | 250/201.3 |
| 2006/0039583 A1 | 2/2006 | Bickert et al. | |
| 2006/0077536 A1 | 4/2006 | Bromage et al. | |
| 2006/0088940 A1 | 4/2006 | Feingold et al. | |
| 2006/0098861 A1 | 5/2006 | See et al. | |
| 2006/0146283 A1 | 7/2006 | Baumann et al. | |
| 2006/0164623 A1 | 7/2006 | Wagner et al. | |
| 2006/0171560 A1 | 8/2006 | Manus | |
| 2007/0025606 A1 | 2/2007 | Gholap et al. | |
| 2007/0091324 A1 | 4/2007 | Paul et al. | |
| 2007/0102620 A1* | 5/2007 | Bublitz et al. | 250/201.3 |
| 2007/0164194 A1* | 7/2007 | Kurata et al. | 250/201.4 |
| 2007/0198001 A1 | 8/2007 | Bauch et al. | |
| 2007/0207061 A1 | 9/2007 | Yang et al. | |
| 2007/0285768 A1 | 12/2007 | Kawanabe et al. | |
| 2008/0002252 A1 | 1/2008 | Weiss et al. | |
| 2008/0020128 A1 | 1/2008 | van Ryper et al. | |
| 2008/0054156 A1* | 3/2008 | Fomitchov | 250/201.3 |
| 2008/0142708 A1 | 6/2008 | Workman et al. | |
| 2008/0180794 A1 | 7/2008 | Tafas et al. | |
| 2008/0240613 A1 | 10/2008 | Dietz et al. | |
| 2008/0283722 A1* | 11/2008 | Uchiyama et al. | 250/201.3 |
| 2009/0040322 A1 | 2/2009 | Leberl et al. | |
| 2009/0046298 A1* | 2/2009 | Betzig | 356/521 |
| 2009/0116101 A1 | 5/2009 | Tafas et al. | |
| 2010/0039507 A1 | 2/2010 | Imade | |
| 2010/0074489 A1 | 3/2010 | Bacus et al. | |
| 2010/0102571 A1 | 4/2010 | Yang | |
| 2010/0109725 A1 | 5/2010 | Yun et al. | |
| 2010/0118393 A1 | 5/2010 | Lin | |
| 2010/0134655 A1 | 6/2010 | Kuroiwa | |
| 2010/0141751 A1 | 6/2010 | Uchida | |
| 2010/0141753 A1 | 6/2010 | Olson et al. | |
| 2010/0171809 A1 | 7/2010 | Fujiyoshi | |
| 2010/0177166 A1 | 7/2010 | Eichhorn et al. | |
| 2010/0188738 A1 | 7/2010 | Epple et al. | |
| 2010/0194873 A1 | 8/2010 | Viereck et al. | |
| 2010/0201800 A1 | 8/2010 | Yamamoto et al. | |
| 2010/0225668 A1 | 9/2010 | Tatke et al. | |
| 2010/0295932 A1 | 11/2010 | Yakomachi et al. | |
| 2011/0017902 A1* | 1/2011 | Hing et al. | 250/201.2 |
| 2011/0037847 A1 | 2/2011 | Soenksen | |
| 2011/0038523 A1 | 2/2011 | Boardman | |
| 2011/0043663 A1 | 2/2011 | Tsuchiya | |
| 2011/0102571 A1 | 5/2011 | Yoneyama | |
| 2011/0109735 A1 | 5/2011 | Otsuka | |
| 2011/0145755 A1 | 6/2011 | Bacus et al. | |
| 2011/0181622 A1 | 7/2011 | Bacus et al. | |
| 2011/0221881 A1 | 9/2011 | Shirota et al. | |
| 2011/0316999 A1 | 12/2011 | Yoneyama et al. | |
| 2012/0002892 A1 | 1/2012 | Eichhorn et al. | |
| 2012/0038979 A1* | 2/2012 | Hing et al. | 359/383 |
| 2012/0069171 A1 | 3/2012 | Kodaira et al. | |
| 2012/0069344 A1 | 3/2012 | Liu | |
| 2012/0076391 A1 | 3/2012 | Dietz et al. | |
| 2012/0076411 A1 | 3/2012 | Dietz et al. | |
| 2012/0076436 A1 | 3/2012 | Dietz et al. | |
| 2012/0081536 A1 | 4/2012 | Kuppig et al. | |
| 2012/0114204 A1 | 5/2012 | Olson et al. | |
| 2012/0120225 A1 | 5/2012 | Maddison | |
| 2012/0127297 A1 | 5/2012 | Baxi et al. | |
| 2012/0281931 A1 | 11/2012 | Eichhorn et al. | |
| 2013/0003172 A1 | 1/2013 | Widzgowski et al. | |
| 2013/0076886 A1 | 3/2013 | Ikeno et al. | |
| 2014/0049632 A1 | 2/2014 | Hemmer | |
| 2014/0085453 A1 | 3/2014 | Yamane | |
| 2014/0112560 A1 | 4/2014 | Soenksen | |
| 2014/0118528 A1 | 5/2014 | Wolff et al. | |
| 2015/0015578 A1 | 1/2015 | Eichhorn et al. | |
| 2015/0153552 A1 | 6/2015 | Loney et al. | |
| 2015/0153555 A1 | 6/2015 | Loney et al. | |
| 2015/0153556 A1 | 6/2015 | Loney et al. | |

FOREIGN PATENT DOCUMENTS

| | | |
|---|---|---|
| EP | 2051051 | 4/2009 |
| EP | 2110696 | 10/2009 |
| FR | 2620537 | 3/1989 |
| GB | 03092 | 11/1906 |
| JP | 09133856 | 5/1997 |
| JP | 2006003543 | 1/2006 |
| JP | 2006343595 | 12/2006 |
| JP | 2008262100 | 10/2008 |
| WO | WO-0154052 | 7/2001 |
| WO | WO-2005015120 | 2/2005 |
| WO | WO-2008118886 | 10/2008 |
| WO | WO-2008141009 | 11/2008 |

OTHER PUBLICATIONS

Sakura Finetek, Australian Office Action mailed Nov. 26, 2013 for Australian App No. 2010222633, 3 pages.

Sakura Finetek, Japanese Office Action mailed Dec. 10, 2013 for JP App No. P2011-553548, 9 pages.

Sakura Finetek, Australian Examination Report dated Dec. 24, 2013 for AU 2011291517, 3 pages.

Sakura Finetek U.S.A., Inc., Chinese second office action dated Dec. 27, 2013 for CN201080017649.4.

Sakura Finetek U.S.A., Inc., EPO second office action dated Nov. 6, 2014 for European Appln. No. 10719379.9.

Sakura Finetek U.S.A., Inc., Final office action mailed Sep. 2, 2014 for Japanese App No. 2011-553548.

Sakura Finetek U.S.A., Inc., Examination Report dated Jun. 19, 2014 for Australian App No. 2011291517.

Sakura Finetek U.S.A., Inc., PCT Search Report and Written Opinion mailed Sep. 22, 2014 for International Application No. PCT/US2014/034477, 12 pages.

(56) References Cited

OTHER PUBLICATIONS

Sakura Finetek U.S.A., Inc., Chinese Final Office Action dated Jul. 3, 2014 for CN Application No. 201080017649.4.

Haruhisa, S., et al., "Application of telepathology for improvement of therapeutic effects and economic efficiency, and development of new equipment for it", Science Links Japan; http://sciencelinks.jp/j-east/article/200516/000020051605A0431066.php, Journal Code: N20051113, (2005), 166-125.

Sakura Finetek, PCT Search Report and Written Opinion mailed Oct. 13, 2011 for Int'l Application No. PCT/US2011/048488., 13 pages.

Sensovation AG, PCT International Preliminary Report on Patentability mailed Sep. 20, 2011 for Int'l Application No. PCT/IB2010/000518., 7 pages.

Sakura Finetek U.S.A., Inc., et al., Canadian Examiner's Report dated Dec. 7, 2012 for CA 2,755,164.

Sakura Finetek U.S.A., Inc., et al., International Preliminary Report on Patentability mailed Mar. 7, 2013 for PCT/US2011/048488.

Sakura Finetek U.S.A., Inc. et al., Chinese Office Action mailed Nov. 15, 2014 for CN 201180047558.X.

Sakura Finetek U.S.A., Inc. et al., Australian Examination Report mailed Feb. 2, 2015 for App No. 2011291517.

Sakura Finetek U.S.A., Inc. et al., European Office Action mailed Jan. 30, 2015 for EP App. No. 11749675.2.

Sakura Finetek U.S.A., Inc. Final office action mailed Apr. 15, 2015 for U.S. Appl. No. 13/212,955.

Sakura Finetek U.S.A., Inc. Partial European search report for Application No. 14198636.4, (Apr. 28, 2015).

Sakura Finetek USA, Extended Search Report for EP15154503 mailed Jun. 19, 2015.

* cited by examiner

AUTOFOCUS METHOD AND AUTOFOCUS DEVICE

CROSS-REFERENCE TO RELATED APPLICATION

This patent application is a U.S. National Phase application under 35 U.S.C. §371 of International Application No. PCT/IB2010/000518, filed Mar. 11, 2010, entitled AUTOFOCUS METHOD AND AUTOFOCUS DEVICE.

The application relates to an autofocus method, in which light from a light source is focused at a measurement light focus in a sample and is reflected from there and the reflected light is guided through an optical system and at least one aperture in two light paths onto at least two detector elements.

PRIOR ART

Two methods are known for automatically focusing microscopes at a sample:

The position of a sample or the distance of the sample from a reference point is measured, in that light reflected from the sample is examined interferometrically for patterns, intensity or the like.

The images of the sample are examined for contrast, resolution, autocorrelation or phase contrast.

In microscopy, a sample is normally made up of a sample material to be analyzed, which is applied to a transparent specimen slide and is covered with a thin transparent cover slip. A position measurement of the sample material frequently leads to measuring the position of one of the reflection planes on the layer interface of the sample. Since a reflection at the air/cover slip interface layer is much stronger than a reflection at an interface layer on the sample material, the air/cover slip reflection typically outshines the reflection at an interface layer on the sample material, which is more suitable for an autofocus.

Measuring the position of a strong reflecting layer above or below the sample and drawing a conclusion about the position of the sample material from the thickness of the sample, which is arranged at a known distance from the reflecting layer is known from U.S. Pat. No. 6,130,745. Typically, however, when using high-resolution systems in the case of the described sample, the tolerances in the layer thickness (e.g., of the cover slip or of specimen slide) are greater than the depth of field of the imaging system and a focusing cannot always be guaranteed with such a method.

The object of the invention is disclosing an autofocus method with which an optical system, e.g., a microscope, can be adjusted in terms of focus quickly and precisely on a reflecting layer of a sample.

ATTAINMENT OF THE OBJECT

This object is attained by a method of the type cited at the outset, in which, according to the invention, the measurement light focus is moved in layers of the sample which reflect light to different extents and the detector elements are arranged in such a way that, in this case, profiles of a radiation property registered by the detector elements are different from each other and a focus position is set in a manner dependent on the profiles. Due to the different profiles of the registered radiation profiles, the position of an especially distinguished layer in the sample, e.g., a reflecting interface, may be found and focused thereon or on a target focus plane arranged at a known distance therefrom.

Surfaces, e.g., interfaces, are also to be considered layers in the following. One of the layers is advantageously an interface. The light paths are expediently separated from one another at least partially, in particular they are separated from one another in the optical system. The separation is accomplished expediently by a shaded area between the light paths. The shading can be produced by a diaphragm.

The profile may be detected by punctiform measurements at several positions of the measurement light focus, separated expediently by light paths. The radiation property of the reflected light may be the radiation intensity. The adjusted focus position is a desired focus position in which the optical system is arranged expediently in relation to the sample in such a way that an image acquisition of the sample produces the desired images.

In addition, because of the invention, the optical path length of the light paths can be specified. The optical path length in this case may be measured from the sample to a diaphragm in front of a detector. The optical path lengths of light paths are expediently selected to be different. A deviation signal to a selected reflecting/scattering sample structure can be generated hereby through the separate analysis of the optical path lengths of the light paths and focused thereon or on a target focus plane arranged at a known distance therefrom. A layer reflecting light may be a reflecting and/or scattering sample structure and may be in particular an interface layer, especially an interface layer or interface adjacent to the sample material.

The autofocus method is a method for automatically focusing the optical system on a desired focus position or target focus plane, e.g., within the sample. If focusing is on the target focus plane, the optical system can form a sharp image of an object arranged there, in an image plane in which a detector or a camera is expediently arranged. After the autofocusing, the sample may be depicted with the aid of a camera.

The sample may be sample material prepared for examination, a slide to which it is applied, and a cover slip, which covers it. A layer structure that is transparent for the autofocus light, on whose layer interfaces a reflection or scattering of the autofocus light is incident, is likewise suitable. The sample does not have to have any transparency for the autofocus light after the layer intended for focusing. The reflection/scattering at an interface layer, which is described here, may also be caused by the reflecting/scattering particle layer or defective layer in the material. The layer interfaces may be pretreated (e.g., mirrored) in order to increase the signals for the autofocus system.

The target focus plane is that plane within the sample on which the optical system is supposed to focus or from which the position of the desired focus is supposed to be removed at a predetermined distance. The target focus plane is expediently a reflection plane on which incident light is reflected. It may be an interface layer within the sample, e.g., the plane of a glass/sample material interface. Similarly, the scattering on the sample itself could be utilized.

The light guided to the light paths expediently originates from a common light source, wherein not just the originally radiating material but also a reflective layer, an aperture or the like is designated as the light source. A one-dimensional or two-dimensional light source is typically used. The two light paths are expediently formed symmetrically to each other and are arranged in particular symmetrically to the optical axis of the optical system.

The light source, which in particular is punctiform or linear or strip-shaped or is made up of several points of light, is focused at the measurement light focus in the sample by the optics. It may be depicted in this way in the sample. The measurement light focus is normally punctiform, but depending on the shape of the light source may alternatively be one-dimensional or two-dimensional and e.g., include several points. The measurement light focus is situated advantageously in the focus or near to the focus of the optical system being focused. The focus of the optical system may be a focus plane. The optical system forms a sharp image in an image plane of an object lying in the focus of the optical system. It is also possible for the measurement light focus to be located at a preset distance from the focus of the optical system. Through this, the measurement light focus may be adjusted on a reflection plane, e.g., an interface layer of the cover slip/sample material, wherein the focus of the optical system e.g., is located 20 µm away from the interface layer in the sample material.

A portion of the light incident on the sample is reflected. In the following, a reflection and/or a scattering may be understood as "reflected." The layer reflecting the light may be a reflecting and/or scattering layer. When we speak of reflection in the following, a scattering is meant to be included therein.

The two light paths are expediently guided symmetrically around the optical axis of the optical system. They advantageously strike the sample in different directions so that their reflections are radiated in different directions and thus may be easily analyzed separate from one another. It facilitates the detection of the individual layers in a layer structure, if the angle of the incident light paths is selected in such a way that reflections of adjacent layers do not overlap one another. If a scattering layer is used to determine the focus position, then the separation of the light paths should first occur in the detection path.

The light of the autofocus system advantageously has a different frequency than light, which may be used to examine or form an image of the sample. The light property is expediently the light intensity.

The optical system may be that of a microscope. It has an optical axis, which is normally aligned perpendicularly to a sample plane in which the sample extends.

The light paths between the light source and the reflection layer or between the reflection layer and the detector may be designed as illumination paths or detection paths. An autofocus light path therefore is made up of an illumination path and a detection path. The difference in the optical path length may now be generated in both the illumination path and the detection path as well as in both (sic) paths. A realization of the detection path is described in the following.

The measurement of the optical path length of the paths takes place by at least one, in particular respectively a diaphragm in front of the detectors. Because of a wavelength-dependent position of the light paths at the diaphragm, it is possible to draw conclusions about the optical path length of the system. A possible realization is described in the following:

The detector elements are arranged in such a way that e.g., relative to an element of the optical system, e.g., relative to a diaphragm, profiles of a radiation property registered by the detector elements are different from one another. The element of the optical system may be a diaphragm, e.g., directly in front of the detector elements, a beam splitter, a mirror or another suitable element.

If light from a light path is reflected on two stacked layers of the sample, then the light path or the optical path length of the light from the one layer, e.g., to the detector or a diaphragm in front of the detector, is longer than the light path or the optical path length from the other layer. Because of this, the two light paths from the two layers, e.g., to the detector elements, may be different. The light paths expediently run so that they are blocked in different ways at a diaphragm in front of the detector elements, e.g., if the one light path is blocked completely or partially and the other is blocked partially or not at all. In this way, it is possible for the light paths to be detected individually and without another light path from another layer.

The main reflection from a glass/air interface layer above the sample is expediently masked by a diaphragm in front of the detector elements while the measurement light focus is moved through layers underneath which reflect light to different extents. Through this, light from these layers may pass through the diaphragm. In this way, layers that reflect considerably weaker than the glass/air interface layer may be detected.

The diaphragm or its aperture is advantageously arranged in an image plane of the optical system, i.e., in a plane in which an object focused by the optical system is projected. The aperture may be an image of the light source.

The light which is reflected from the measurement light focus is expediently projected in the plane of the diaphragm in accordance with the shape of the measurement light focus. The diaphragm is advantageously arranged such that it allows light from both light paths reflected in the measurement light focus to pass through, in particular to an equal extent. Through this the diaphragm expediently blocks light, which was reflected above and below the measurement light focus completely or asymmetrically with respect to the two light paths.

The aperture is expediently arranged not as usual around the optical axis of the optical system rather asymmetrically to the optical axis, in particular asymmetrically to the optical axis of the two light paths at the location of the aperture. In particular, it is arranged completely outside of the optical axis. Through this it is possible to achieve in a simple manner a selection of the one or other light path for a separate analysis at different positions of the measurement light focus.

An especially precise focusing may be achieved if the profiles are detected continuously.

In an advantageous embodiment of the invention, a focus of the optical system is adjusted such that the signals of the detector elements are in a fixed ratio to one another. In the case of an incidence of light on the detector elements in a fixed ratio, a position of symmetry between the light paths and thus the target focus plane may be detected in a simple way. This may be accomplished even more simply if the signals are equally strong. The difference in the path length of the paths is selected in such a way that, when the signals are superimposed, the signals overlap on a flank and therefore have a point of intersection. The signals are equally strong at this point of intersection. With the aid of a zero crossing of the differential signal, the same strength of the signals may be detected in a simple manner.

Another embodiment of the invention provides for a target position of a focus of the optical system to be detected the aid of the signals of the detector elements and for the focus to be adjusted with the aid the detected target position by an actuator. The target position may be a position output by the actuator, e.g., the position at which the signals of the detector elements are equal. It is also possible to use this adjustment only as a pre-adjustment. Alternatively or e.g., as a precision adjustment, it is conceivable to reach the target position by a regulating process, wherein the detector signals are used as regulating input signals and a signal for controlling the actuator is used as a regulating output signal.

A simple and reliable automatic focusing may be achieved if the detector elements are calibrated so that the strength of their signal, which is caused by light reflected by an interface layer, is the same. Through this the focus position is expediently adjusted in the reflecting layer or the layer reflecting light. Alternatively, the detector elements may be adjusted in such a way that their signal strength is different in a targeted manner, e.g., in order to achieve a targeted focus offset.

A good orientation when searching for the target position of the focus or the target focus plane may be achieved if the measurement light focus is moved through the target focus plane toward a sample/air interface and the reflection of the sample/air interface is used for a rough orientation.

To examine a sample it may be necessary that it be examined at different locations, e.g., if it is larger than the field of view of a microscope. To do so, after a first examination, it is moved perpendicularly to the optical axis of the optical system after and then reexamined. A quick automatic focusing after such a movement can be achieved, [in that] the signals of the detector elements after movement of the sample perpendicular to the optical axis of the optical system are checked for plausibility with respect to the rough adjustment still in effect on the target focus plane. If there is plausibility, it is possible to dispense with a time-consuming complete re-focusing. The plausibility may be a limit value in the difference of the signals, which may not be exceeded. In addition, plausibility testing may also be used for making a rough adjustment so that, if there is plausibility, only a fine adjustment still needs to be made.

Another advantageous embodiment of the invention provides for the light source to have a light pattern, which is projected in the sample. The light pattern may be one-dimensional, two-dimensional or three-dimensional and is expediently projected in a plane perpendicular to the optical axis of the optical system in the sample. In this case, the reflected light is detected from several pattern points of the light pattern respectively separated by light paths. As a result, a tilting of the target focus plane, e.g., to the optical axis, can be detected from several target positions of the several pattern points. The signals generated in this way may be utilized for regulating the autofocusing.

Furthermore, the invention is directed at an autofocus device with an optical system for focusing light at a measurement light focus in a sample and for guiding light reflected from there through an aperture onto at least two detector elements.

It is proposed that the autofocus device include an actuator and control means for moving an element of the optical system or the sample via the actuator in such a way that the measurement light focus is moved in layers of the sample which reflect light to different extents, wherein the detector elements are arranged in such a way that, in this case, profiles of a radiation property registered by the detector elements are different and the control means is provided for evaluating the profiles at several positions of the measurement light focus.

In the case of the movement of the element of the optical system relative to the sample, the actuator may move the element or the sample relative to a fixed reference point, e.g., the ground.

The control means is advantageously designed to control one, several or all of the above-mentioned process steps.

The autofocus device advantageously includes a measuring system which is provided to detect the distance of the element of the optical system from the sample or a distance dependent thereon, in particular in a non-optical way. As soon as the focus position is found optically, the distance may be measured with the further measuring system and maintained during illumination of the sample.

Using a color camera with a color-sensitive detector is known for making color images. A color-sensitive detector is normally limited to three colors. When using a Bayer pattern, a pixel is respectively made up of one blue, one red and two green-sensitive detector cells from whose signals all intermediate colors are composed. Because of the required four detector cells per pixel, the resolution of this type of a color detector is low.

A line spectrograph is known for achieving a high image resolution in conjunction with a high color resolution. An object is scanned line-by-line, wherein the image of a line is spread out spectrally, for example by a prism, so that a three-dimensional image of the line develops. In this way, a three-dimensional image is acquired and saved line-by-line and the individual images are assembled to form a three-dimensional color image.

Also known is moving several color filters in succession in front of the detector and thus successively making several images of an object in different frequency ranges. The shots may be combined into a hyperspectral image.

An object of the invention is disclosing a method for taking an image of an object with which high-resolution color images can be made.

This object is attained by a method for taking an image of an object in which the object is projected by an optical system onto several detector elements of a detector and the image is separated with a light filter with several filter areas that filter differently into several image areas that filter differently. According to the invention, it is proposed that the differently filtered image areas of the image are projected simultaneously onto the detector, in particular side by side. It is possible to dispense with changing filters in front of the detector and it is also possible to take shots of the object in rapid succession.

The light filter may be a spectral filter or a polarizing filter. It may be arranged immediately in front of the detector or directly on the detector. The light filter is expediently arranged in an image plane of the optical system, wherein $\frac{1}{10}$ of the focal distance of the optical system is tolerable on the light filter as the distance from the mathematical image plane and can be viewed as still in the image plane. The light filter may be a cut-off filter, interference filter or absorber filter. The filter areas may be different in terms of spectral filtering so that the image areas are filtered differently spectrally. They may adopt concrete forms, for example strips, a checkerboard pattern and/or a micropattern, in which the filter areas have a length and/or width less than 100 μm. In terms of their expansion, the filter areas are expediently greater than two, in particular greater than ten, detector elements or pixels. A spatially continuously varying filter characteristic is likewise possible.

The detector may be designed as a chip and is expediently sensitive in all spectral ranges of the filter areas. It may be a CCD (charge-coupled device) or a CMOS sensor (complementary metal oxide semiconductor). The detector elements are advantageously arranged as a two-dimensional lattice in the form of a matrix. The detector is designed expediently as a monochrome detector and is sensitive in the spectral range of the structured filter.

The dimensions of the filter areas are advantageously adapted to the dimensions of the detector elements, for example in that a width and/or length of a filter area are respectively an integer multiple of a quantity of one of the detector elements of detector, for example m×n detector elements. The light filter may be fastened directly on the detector, for example directly on a detector chip, or be deposited directly on the sensitive areas of the chip.

The filter areas correspond expediently to a structure and/or organization of the sample image or the sample or the sample receptacles. They may be as large as regular structural sections of the sample image and/or have their shape.

In an advantageous embodiment of the invention, the filter areas are moved from one to the next shot of the object via an image pattern of the image so that every point of the image pattern is recorded in several light characteristics, in particular spectra. These values are expediently allocated to the point and can be depicted and/or stored. The image pattern in this case may be the entire image or a section of the image. The movement is a relative movement, wherein the filter areas may rest, e.g., relative to a detector housing, and the image pattern is moved, or vice versa.

In the case of multiple shots of each point in several light characteristics, for example colors, a color image may be composed from the several shots. Due to the separation of the light filter into the filter areas, when moving the light filter, only one small movement in the size of a dimension of a single filter area is sufficient so that it is not necessary for the entire light filter to be moved away from the detector and a new light filter to be moved to the detector. Because of the short path of movement, the movement may be executed very quickly.

To achieve a high light yield, it is advantageous if signal contributions in the individual detector elements within a filter area, which may be allocated with a movement of the sample image relative to the detector of a sample area, are accumulated in a value. Such accumulated values of a sample area from different filter areas may be combined into overall information about the light characteristics of the sample area.

The image pattern may remain at rest at least during the movement of the filter areas to the detector, so that the filter areas are moved relative to the detector. It is also possible to move the image over the detector so that the filter areas are at rest relative to the detector. Moving the image over the detector may be accomplished with a movement of the optical system or a portion of the optical system relative to the detector. A further possibility is moving the filter and the detector relative to the optical system, which, for example, is at rest relative to a camera housing. Generally speaking, one or two of the three elements of detector, light filter and optical system may be kept at rest relative to a camera housing for example, whereas the remaining two elements or the remaining one element are/is moveable relative to the other elements.

The optical system is advantageously part of a microscope, whose housing is solidly connected to a specimen stage on which the object can be moved in the form of a sample, e.g., on a moveable tray, in particular with the aid of motorized drive and a position control via a control means.

The object is advantageously moved relative to the optical system and the light filter and the object is acquired in several shots respectively image-section-by-image-section, wherein the position of the filter areas in the image sections is respectively unchanged. The optical system in this case may be at rest in a housing, for example of the microscope, and the object and with it the light pattern of the object are guided past the optical system, wherein the image sections and with them the filter areas move over the entire image.

If, for example, the object is elongated, e.g., in the form of a row of samples then it is possible to record the entire object through a plurality of successively recorded image areas, wherein each image point of the object was recorded in many colors or in each color or through each filter area. In this way, it is possible to make a color image of the entire object very rapidly. It is possible to dispense with moving the color filter relative to the optical system or to the detector. Because a device for taking images of samples is frequently guided via an actuator for controlled movement of samples along the recording device, for example the microscope, the recording device may be remain held hereby in an especially simple manner.

The filter areas are expediently designed as strips, which extend from one side of the image to the opposite side of the image and are aligned in terms of their longitudinal direction perpendicular to the movement direction. Also an extension from one side of the image section to the opposite side of the image section is sufficient. Every image point of the object may hereby be guided over all filter areas of the light filter in an especially simple manner.

The movement is advantageously such that an image point is moved by the width of a filter area from one shot to the next shot. The width is expediently respectively several pixels. A small overlapping area, e.g., corresponding to double the precision of the moved actuator, is meaningful in this case.

In order to achieve an especially high resolution, in particular in the case of especially interesting image sections, it is advantageous if the movement from one image acquisition to the next image acquisition is less than one image pixel. Because of the movement in the subpixel range, a subpixel resolution can be computed.

The default for the movement is advantageously specified by a control means, which in particular independently detects especially interesting image areas and triggers a subpixel movement. The movement may be carried out in different modes, e.g., a subpixel mode, a filter area-wide mode in which the movement from one shot to the next shot amounts to the width of a filter area, or a multi-pixel mode in which the movement amounts to several pixels of the detector. A control of only two of the three described modes is also possible.

In an advantageous embodiment of the invention, the light filter is a cut-off filter, whose cut-off frequency varies in the spatial profile of the light filter perpendicular to the cut-off and in particular perpendicular to the movement. In this way, by controlling the movement increment from one shot to the next shot, the color resolution of an entire image can be controlled from the shots. The light filter is connected expediently to an actuator and a control means, which is used to control a movement of the light filter.

In addition, it is proposed that the light filter include two cut-off filters arranged in succession in the optical path of the image, whose cut-off frequency in the spatial profile of the cut-off filters respectively perpendicular to the cut-off (and in particular perpendicular to the movement) varies with a frequency response that is opposite from one another. With a corresponding arrangement of the cut-off filters with respect to one another, a spatial transmission window can be generated hereby, which may be both spatially as well as spectrally enlarged and reduced by moving the cut-off filters to one another. As a result, this allows a high variability to be achieved in the frequency and spatial area of the recorded images.

An especially good spectral adaptation of the detector and light filter may be achieved, if the detector has several detector regions that are different in terms of color sensitivity and respectively sensitive in one color area and at least one respective filter area is arranged in front of every detector region. This is advantageously adapted in terms of its color area to the color area of the detector so that the color areas of the light filter are different. The adaptation is accomplished advantageously in that the transmission of the filter area is in the sensitivity range of the corresponding detector region and is not in a color area of one of the other detector regions.

The different detector regions may be arranged spatially directly side by side, for example in a cohesive matrix of detector elements, or set up spatially separated from one another so that the optical system includes one or more elements for guiding the image of the object to several detector regions, for example a dichroic mirror or the like. The detector regions are advantageously operated synchronously so that an image of the object at the detector regions is taken simultaneously in several color channels.

Another advantageous embodiment of the invention provides that the filter areas have different transmission values and the transmission values are respectively adapted to a recording characteristic of the detector, in particular to achieve a uniform image exposure with an inconstant spectral sensitivity of the detector elements. In this way, it is possible to achieve an especially good image result. The adaptation may be effected by a different size of the filter areas. Another possibility is adapting a different frequency transmission width of the filter areas to the detector. Thus, a frequency transmission width may be greater in a frequency range in which the detector is less sensitive, and less in a frequency range in which the detector is more sensitive.

In addition, it is also possible to adapt the transmission strength, i.e., a damping of the filter area, to the detector so that a higher damping is selected in a frequency range in which the detector is more sensitive than in other frequency ranges.

A high image quality may likewise be achieved if the filter areas have different transmission values and a triggering of the detector elements is adapted to a transmission value of the filter area shading it. Thus, an amplification can be boosted, an integration time can be lengthened or pixels can be consolidated, if a filter area has a high damping as compared with another filter area. This makes it possible to achieve a uniform exposure of the image in all frequency ranges. If the transmission value of a filter area is especially high, it is also possible to read out only every second pixel.

The different triggering of the detector elements advantageously follows a movement of the filter areas over the detector. If, for example, the light filter is moved over the detector, this movement may be detected so that each filter area may be allocated the detector elements that are covered by the area. Control of the detector elements can be adapted hereby pixel-by-pixel to the respectively allocated filter area.

Furthermore, the invention is directed at a device for taking an image of an object with a detector, which has several detector elements, an optical system for projecting the object onto the detector and a light filter with several filter areas that filter differently.

Especially high-resolution color images can be made, if the light filter is arranged so that several image areas of the image of the object are projected simultaneously onto the detector; these image areas are filtered through the filter areas differently.

The device includes a control means, which is advantageously provided to control one, several or all of the above-mentioned process steps.

The invention will be explained in more detail on the basis of exemplary embodiments, which are depicted in the drawings.

The drawings show:

FIG. 1 A schematic representation of a microscope with an autofocus device

Figure 2:
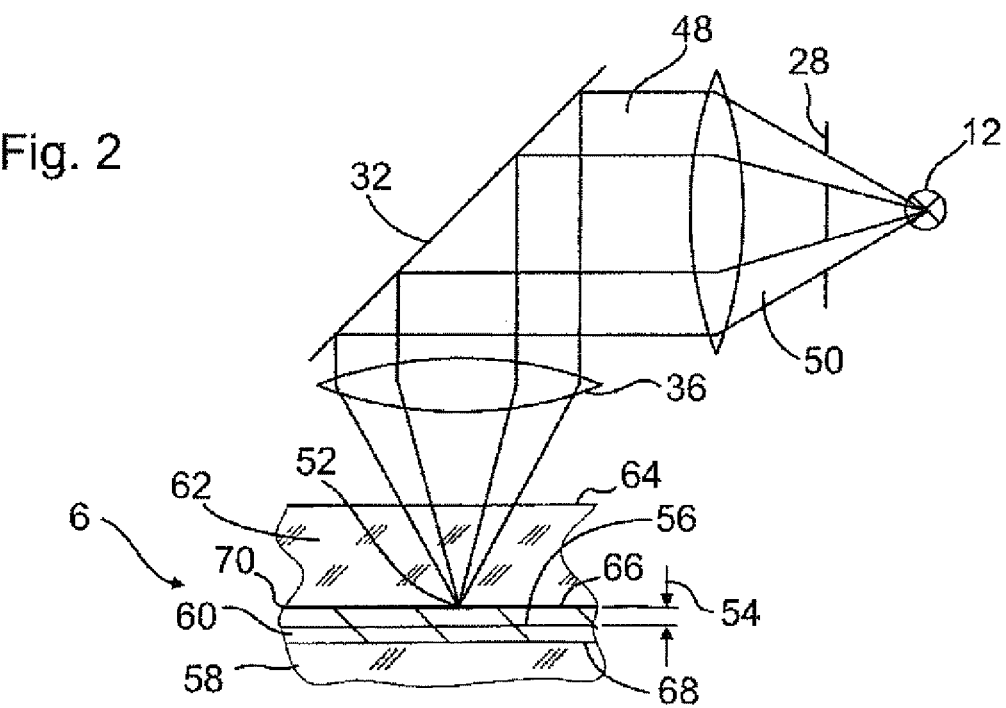
Figure 5:
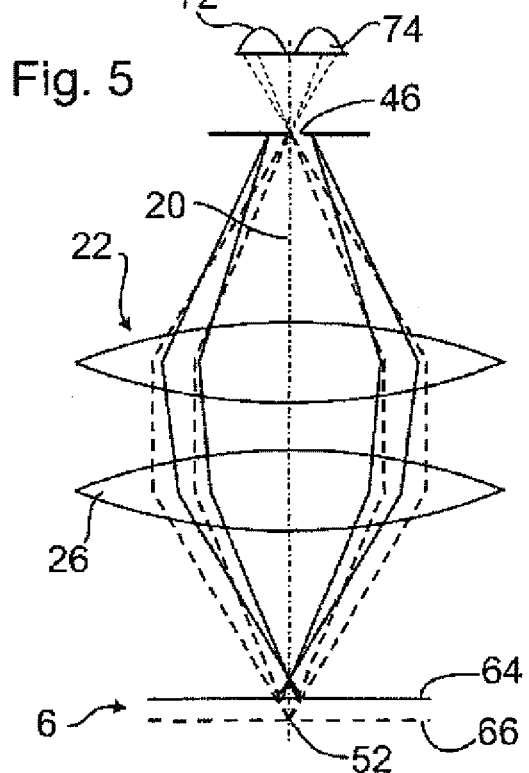
Figure 6:
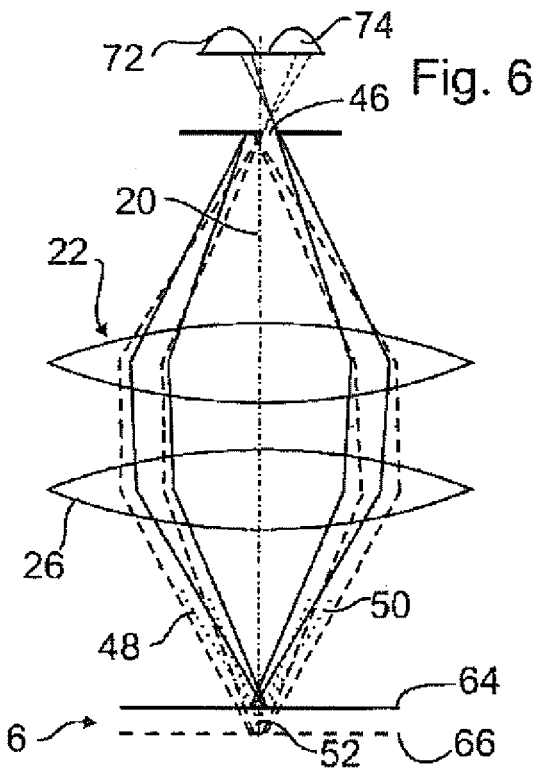
Figure 7:
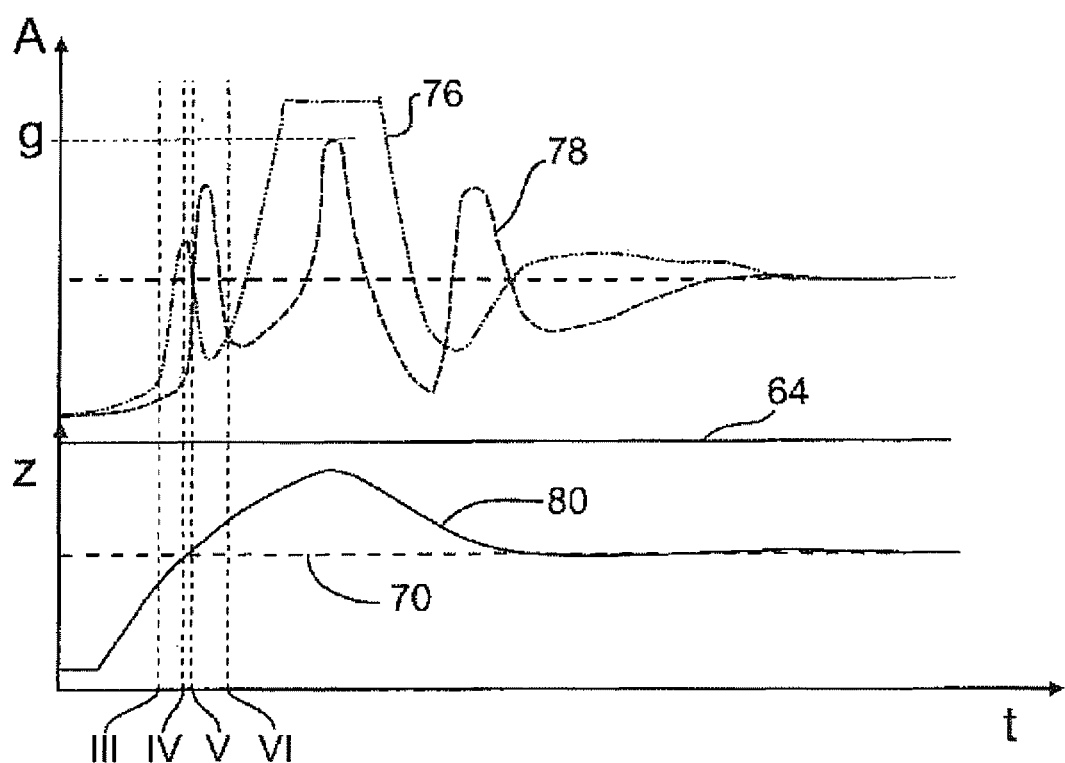
Figure 8:
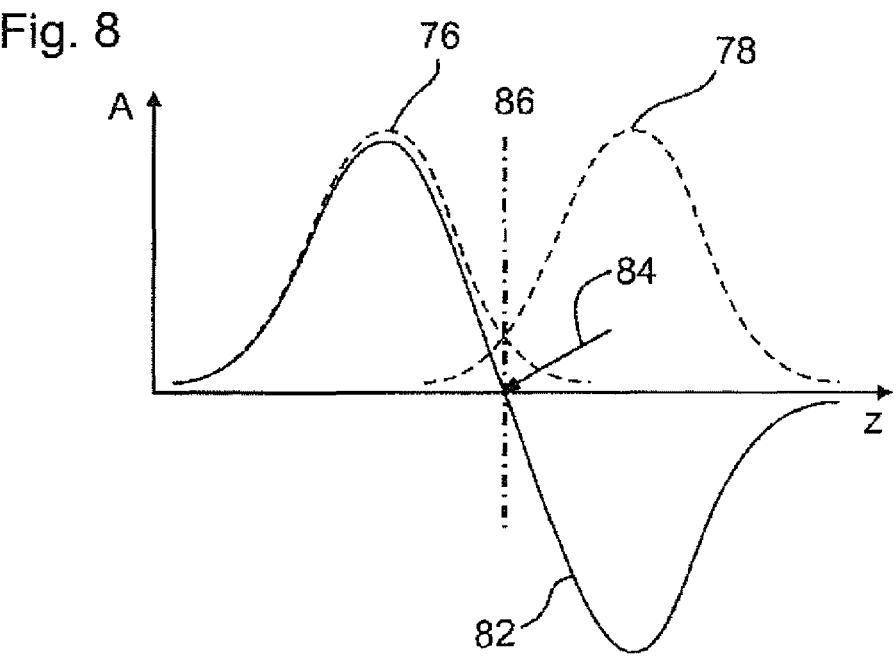
Figure 9:
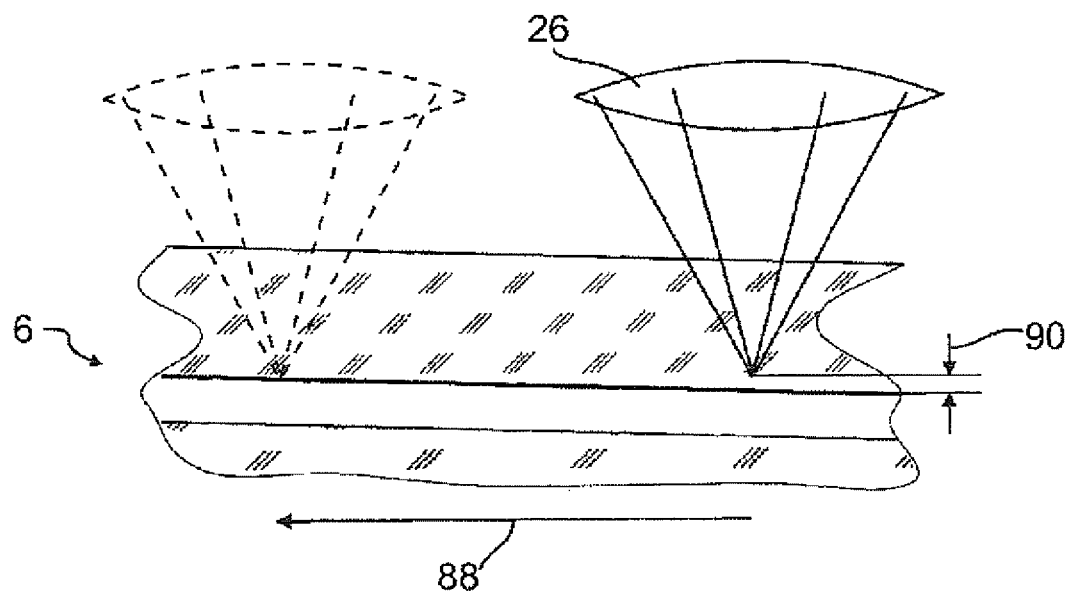
Figure 10:
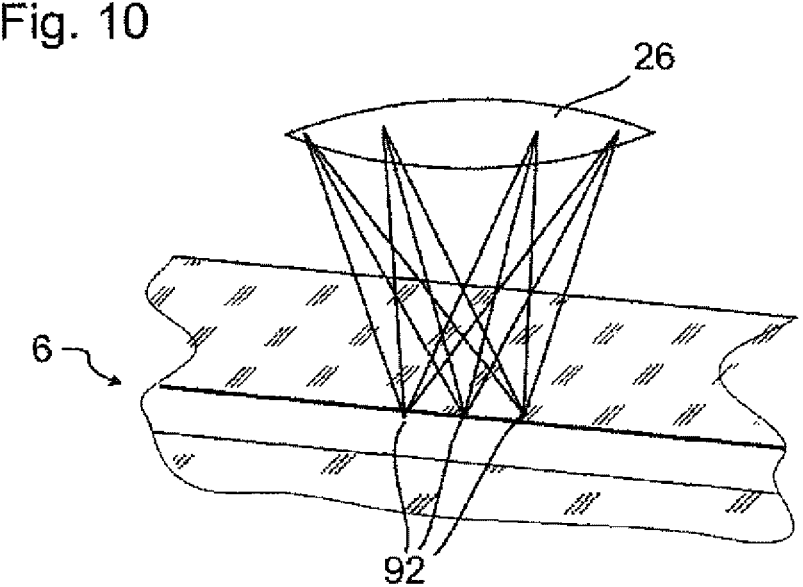
Figure 11:
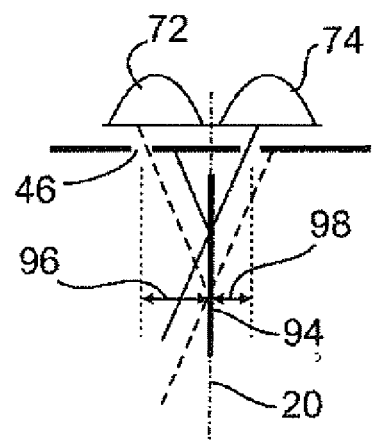
Figure 12:
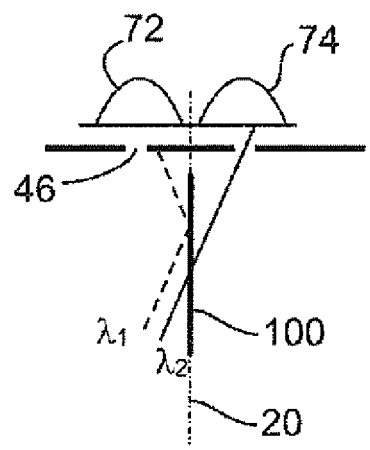
Figure 13:
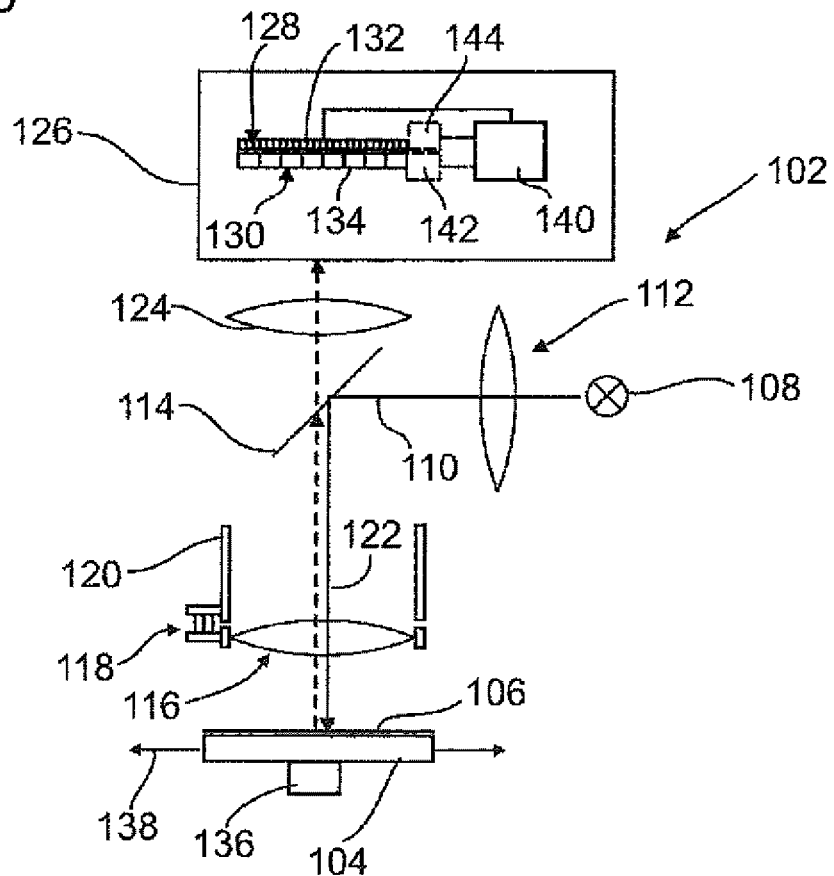
Figure 14:
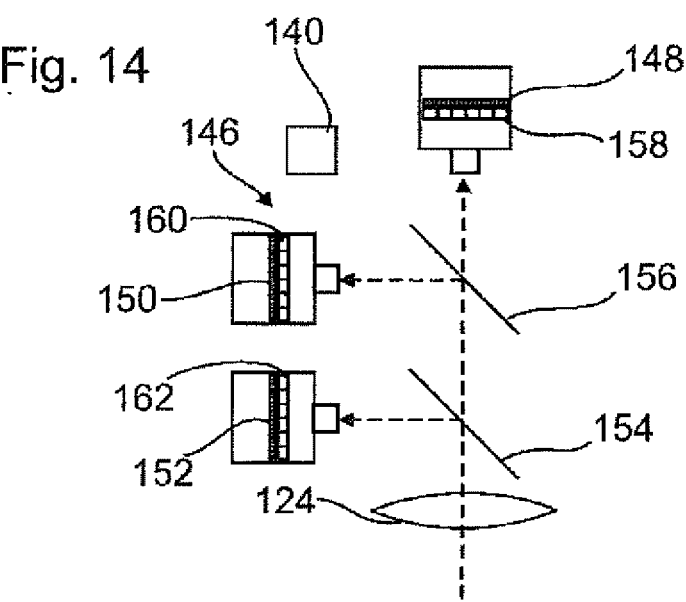
Figure 17:
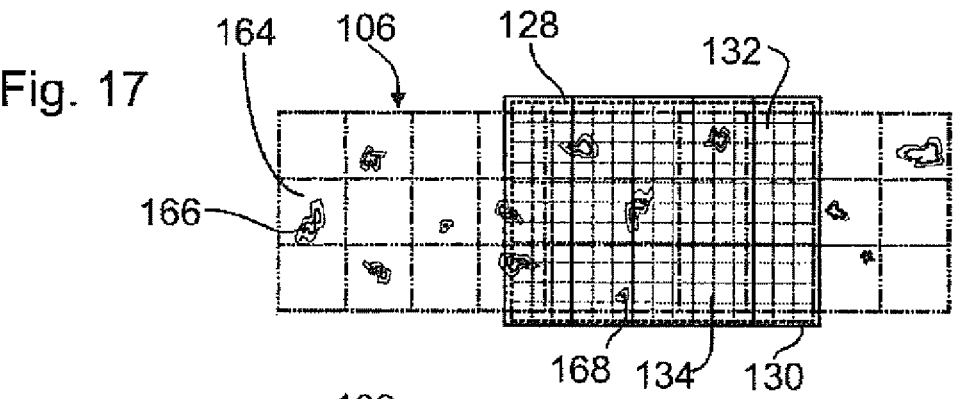
Figure 18:
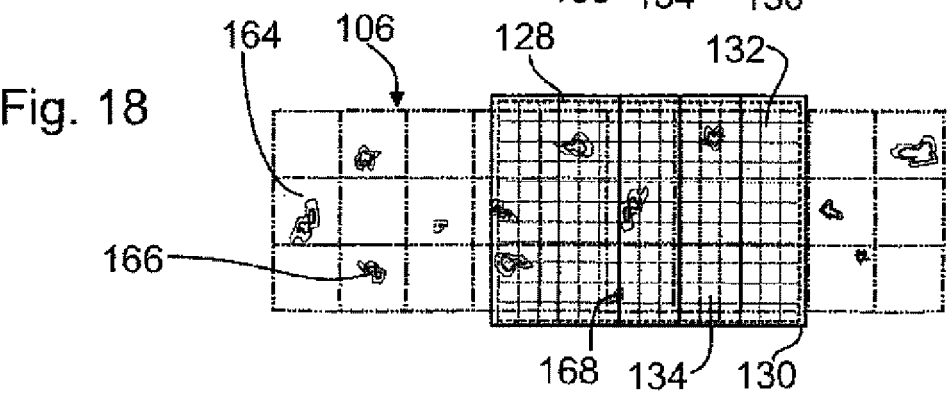
Figure 19:
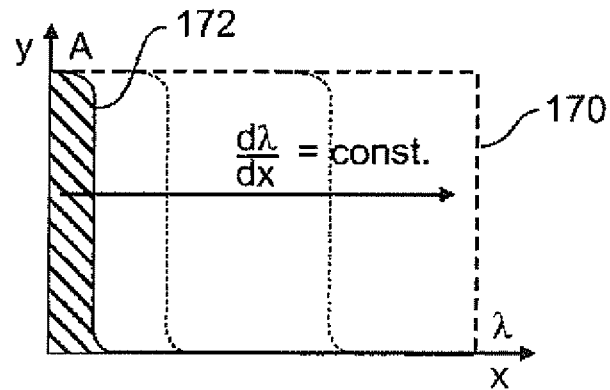
Figure 20:
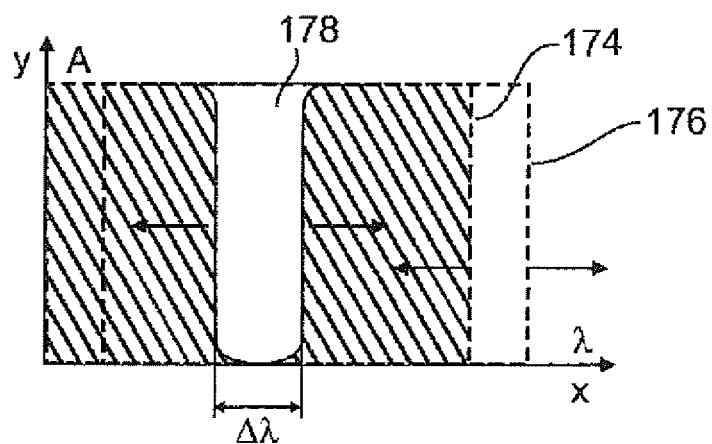
Figure 21:
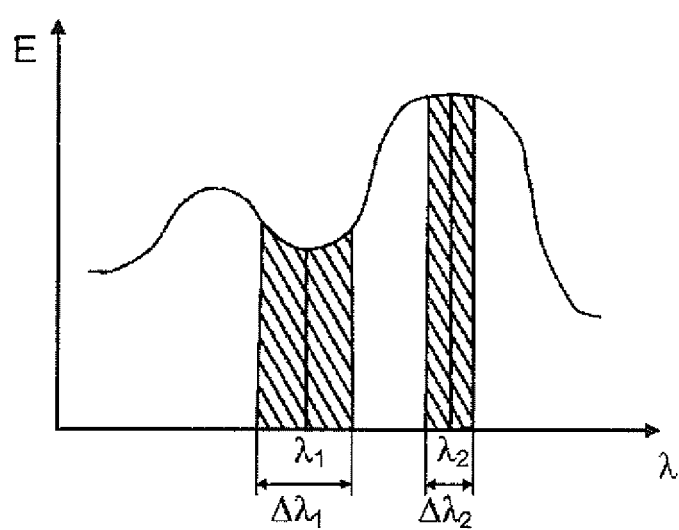

FIG. 2 A schematic representation of an optical path or illumination paths of the autofocus device on a sample FIG. 3-FIG. 6 Reflection optical paths or detection paths of the sample on two detector elements FIG. 7 A diagram of signals of the detector elements and a modified operating distance plotted over time FIG. 8 A schematic diagram of the signal with a differential signal FIG. 9 A projection of a point of light on a moved oblique sample FIG. 10 A projection of a light source pattern on a resting oblique sample FIG. 11 A separation of an optical path by a semi-transparent mirror FIG. 12 A separation of an optical path by a dichroic mirror FIG. 13 A schematic representation of a microscope directed at a sample with a camera having a light filter on a detector FIG. 14 An optical path of a sample onto three detectors FIG. 15-FIG. 18 A detector with a light filter in four different positions with respect to a sample FIG. 19 A diagram of an cut-off filter with a continuously migrating cut-off in the filter surface FIG. 20 A transmission diagram resulting from two cut-off filters arranged in succession FIG. 21 A sensitivity diagram of a detector FIG. 1 depicts an autofocus device 2 which is integrated into an optical imaging system 4. The optical imaging system in this special embodiment is a microscope for fluorescence analysis of biological material in a sample 6. For this, the optical imaging system 4 includes an image detector 8 or a camera, which is connected to a control means 10 for acquisition control and saving of images taken, or an eyepiece for observing the sample directly. The control means 10 is part of both the optical imaging systems 4 as well as the autofocus device 2 and is used to control the autofocus methods described in the following.

The autofocus device 2 includes a light source 12, which makes light available for the autofocus method. It may also provide the light for the fluorescence analysis, wherein, as a rule, it is more expedient for the optical imaging system 4 to have another light source (not shown) for this. The light source 12 has a light generator 14, e.g., a LED (light emitting diode), and optics 16 for shaping the radiated light, which may include a light diffuser. A diaphragm 18 with an opening pattern generates a one-dimensional or two-dimensional light source pattern, which is expediently symmetrical to an optical axis 20 of an optical system 22, which may include additional optical elements 24 and an objective 26 of the optical imaging system 4 besides the optics 16. A spatially defined light source may also replace the elements 16 and 18. A means 28, which amounts to an aperture, separates the illumination of the sample 6 from the light source 12 into several light paths, which run separated from one another from the means 28 to the sample 6 and are brought to a common measurement light focus (illumination paths) in the sample 6. The means 28 may alternatively be attached in the detection path (see below) between elements 30 and 46, in particular when focusing on scattering objects.

Light from the light source 12 is directed to the objective 26 of the optical imaging system 4 via two beam splitters 30, 32 in the form of dichroic or semi-transparent mirrors; the optical imaging system is mounted in a microscope housing 34 and focuses the light on the sample 6. To do so, the objective 26 has an optical element 36, e.g., a lens, which is movable in a controlled manner along the optical axis 20 of the objective 26 by means of an actuator 38. Controlling the position of the optical element 36 and therefore of the focus in the sample 6 is accomplished by the control means 10. The actuator itself may include an independent distance meter.

Light reflected from the sample 6 passes through the objective 26 in the opposite direction, as indicated by a dashed arrow, and is guided via the beam splitter 32, on the one hand, to optics 40 and to the image detector 8 and, on the other hand, via the beam splitter 30 and additional optics 42 to a detector 44, which includes several detector elements (detection path). The detector elements may be individual sensors, e.g., photodiodes, or a lattice of sensors. Arranged in front of the detector 44 is a diaphragm of the optical system 22 with an aperture 46, which is shaped in accordance with the aperture of diaphragm 18 and is arranged in the image plane of the optical system 22 in which an image of the sample 6 is generated and therefore of the light source pattern projected on the sample 6. The diaphragm opening 46 may include one or several openings and is designated in the following only as aperture 46. The detector 44 supplies its signals to the control means 10, which evaluates them and uses them as a control or regulation input for controlling the actuator 38. In addition, the control means may process the independent distance signal of the actuator 38 and optionally use it for regulation.

FIG. 2 shows a schematic representation of an optical path (illumination path) of the autofocus device 2 in two light paths 48, 50 on the sample 6. In this exemplary embodiment, the light pattern of the light source 12 is reduced to a point of light, which radiates through two openings of the means 28 for separation into the light paths 48, 50. In the case of a diaphragm 18, which generates for example two points of light, as depicted in FIG. 1, light from each point of light is divided into two light paths 48, 50, as indicated by the means 28 in FIG. 1.

Light from both light paths 48, 50 is focused at a punctiform measurement light focus 52 in the sample 6, which may have the shape of the light source and e.g., is punctiform, is elongated corresponding to a slit-shaped light source or has another optional shape. Since both the light for the measuring light from the light source 12 and the light for examining the sample are guided through the objective 26, the measurement light focus 52 may be in the focus of the camera or the optical imaging system 4, which may be a focus plane. However, it is also possible for the measurement light focus 52 to be removed from a focus 56 of the camera by a pre-known distance 54.

The typical sample 6 includes a specimen slide 58 on which biological sample material 60 is applied, which is covered with a thin transparent cover slip 62. This sample 6 reflects incident light on three interfaces 64, 66, 68, namely the strongly reflecting air/glass interface 64, the considerably less strong reflecting glass/sample material interface 66 and the sample material/glass interface 68 (which is not considered further in the following), wherein, in the case of very thin sample materials, the signals develop a combination from the interfaces 66 and 68. In this case, the glass/sample material interface 66 forms a target focus plane 70 described in this first exemplary embodiment, in which the measurement light focus 52 is supposed to be guided by the autofocus method.

The autofocus method carried out for this is described on the basis of FIGS. 3-8. FIGS. 3-6 show the optical system 22 and the objective 26 in a very simplified way located above the sample 6, which is indicated only on the basis of interfaces 64, 66. The detector 44 is represented on the basis of two detector elements 72, 74, which are arranged on both sides of the optical axis 20. In the case of an arrangement as in FIG. 1 with two point light sources, there would be four detector elements. The aperture 46 in front of the detector 44 expediently has the same form as the light source, i.e., punctiform or circular in this exemplary embodiment. It is arranged in such a way that it is located asymmetrically offset from the optical axis 20, wherein the axis 20 lies outside of the aperture 46, i.e., does not pass through it.

The portions of the two light paths 48, 50 that are incident on the sample 6 are depicted by thin dots and are directed at the measurement light focus 52, which is in the specimen slide 58, i.e., beneath the target focus plane 70, which is identical to interface 66. The different light paths from the different interfaces 64, 66 to the aperture 46 or to the detector elements 72, 74 are depicted in different ways. The light path of the main reflection that is reflected from the strongly reflecting interface 64 is represented by solid lines and the light path of the light that is reflected by the less strongly reflecting interface 66 is represented by dashed lines. It is evident that, for one, no light or negligibly little light is reflected in the measurement light focus 52 and, secondly, the light reflected by the interfaces 64, 66 misses the aperture 46 so that no light from it reaches the detector elements 72, 74.

Figure 3:
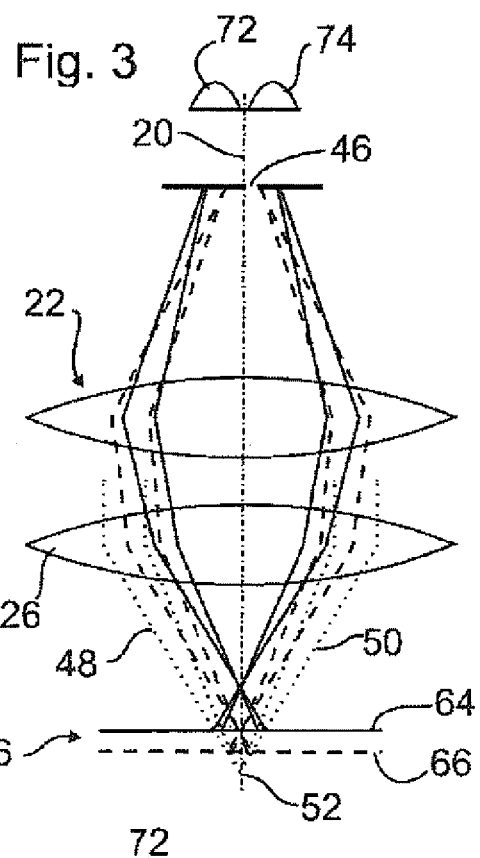
Figure 4:
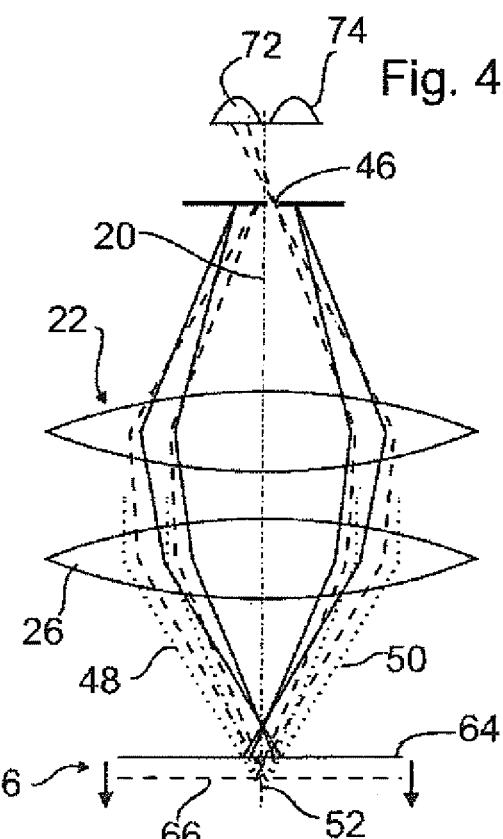

In FIG. 4, the sample 6 is moved downwards as compared to the depiction in FIG. 3, as indicated by arrows, so that the measurement light focus 52 was moved upwards relative to the sample 6. Moving the sample 6 is equivalent to moving the objective 26 using the actuator 38. In the position depicted in FIG. 4 of the sample 6 relative to the objective 26, the measurement light focus 52 is located just beneath the interface 66. Because of the asymmetry of the aperture 46 to the optical axis 20, in this position reflected light from the light path 48 passes through the aperture 46 and hits the detector element 72, whereas light from light path 50 misses the aperture 46 so that the detector element 74 remains shaded.

With a further movement of the sample 6 downward or of the measurement light focus 52 in the sample 6 upwards, the measurement light focus 52 reaches the interface layer 66 and the target focus plane 70, as depicted in FIG. 5. The reflections of both light paths 48, 50 cross at the image plane, in which the diaphragm and the aperture 46 are arranged. Because of the asymmetrical aperture 46 outside of the optical axis 20, both light paths 48, 50 are largely shaded, but not completely due to the flat aperture of the light paths 48, 50. Both detector elements 72, 74 respectively receive a little and the same amount of light and transmit an identical signal to the control means 10.

FIG. 6 shows the light paths 48, 50 with an even further movement of the sample 6 downward or of the measurement light focus 52 in the sample 6 upward. The measurement light focus 52 exits the interface layer 66 and approaches the interface layer 64 so that the reflection of the interface layer 66, which reaches only the detector element 74, continues to be shaded and the reflection of the interface layer 64 falls ever more strongly through the aperture 46 on the detector element 72.

The aperture 46 is arranged in the image plane of the objective 26. Light reflected from the measurement light focus 52 passes through the aperture 46 and namely expediently to an equal extent from both light paths 48, 50. The aperture 46 in this case is arranged so that light which is reflected from above or below the measurement light focus 52 passes through the aperture 46 from the two light paths 48, 50 to an unequal extent. An equally strong illumination of the detector elements 72, 74 therefore means that one of the interface layers 64, 66 lies in the measurement light focus. The aperture in this case is advantageously only so large that light from an interface layer 64, 66 which is further than 100 μm away from the measurement light focus 52 cannot pass through the aperture 46 from any of the light paths 48, 50.

The aperture 46 makes it possible to select the light from different light paths according to the optical path length. Similarly, a selection of the light from different light paths is made possible according to their different direction[s] toward the detector elements 72, 74.

FIG. 7 plots the amplitudes A of the signal 76 of the detector element 72 and of the signal 78 of the detector element 74 over the time t in the case of movement of the measurement light focus 52 in the sample 6 as described in FIGS. 3-6. In addition, the movement of the position 80 of the measurement light focus 52 in z-direction, which is parallel to the optical axis 20 of the objective 26, is plotted over the time t correlated to the signals 76, 78. Four points in time III, IV, V, VI are marked, which correspond to the positions 80 of the measurement light focus 52 in FIGS. 3, 4, 5 and 6.

To automatically focus the sample 6, first of all the light generator 14 of the autofocus light source 12 is switched on and the objective 26 or its optical element 36, which is moveable via the actuator 38 into its initial position (in the figures completely downward in the direction of the sample 6), moves so that the measurement light focus 52 is located within the sample 6 and there it is expediently located within the specimen slide 58.

Now the actuator 38 is moved in such a way that the measurement light focus 52 is moved completely through the sample material 60 and through the target focus plane 70. At the same time, the signals 76, 78 of the detector elements 72, 74 are continuously recorded and a position signal of the actuator 38 is expediently recorded as well. To begin with, the signal 76 of the detector element 72 increases and then quickly drops again. Then the signal 78 of the detector element 74 increases and drops again, both according to the incidence of light through the aperture 46 as described in FIGS. 4-6.

In particular, the position of the intersection of the flanks of the signals 76, 78, called the target position in the following, is recorded, in which the measurement light focus 52 is located in the target focus plane 70. This target position is detected by the control means 10, which is connected to the actuator 38, which transmits its position or that of the optical element 36 to the control means 10 continuously or at the request of the control means 10.

Again the sharp increase first of the signal 76 and then of the signal 78 over a limit value g is taken as a sign and orientation that the measurement light focus 52 is approaching the strongly reflecting interface 64 and therefore is located above the target focus plane 70. The movement of the measurement light focus 52 upwards is stopped.

Now the actuator 38 may be adjusted in a simple process step in accordance with the detected target position and the sample 6 is focused very swiftly. The measurement light focus 52 is adjusted to the target focus plane 70 and thus also the focus of the microscope 4, when the measurement light focus 52 is located in this focus. Otherwise, the focus is adjusted to a desired plane, which is removed by a known distance from the target focus plane 70.

A more precise focusing is achieved if the movement of the measurement light focus 52 is reversed and this time the measurement light focus 52 is guided into the sample material 60 more slowly, as shown in FIG. 7. The maximum of the signal 76 forms again, and an adjustment of the signals 76, 78 to signal equality guides the measurement light focus 52 into the target focus plane 70.

An alternative method may be begun so that the measurement light focus 52 is located above the sample 6 and run into the sample 6 from there. The first incident main reflection from the glass/air interface layer 64 is clearly identified.

Because the thickness of the cover slip 62 is known, e.g., 170 µm, the measurement light focus 52 may be moved downwards swiftly by this or a somewhat shorter distance. Then the movement speed can be reduced and the measurement light focus 52 moved further downwards until the signals 76, 78 are equally strong.

A regulation to the target position based on the signals 76, 78 is explained in the following on the basis of FIG. 8. A differential signal 82 is formed from the difference between the signals 76, 78, e.g., by subtracting the signals 76, 78, and used as the control variable, with the zero crossing 84 as the control target value. In the zero crossing 84, the measurement light focus 52 is located in the target position 86. The detector 44 is advantageously calibrated for this so that the signals 75, 78 are equal when the measurement light focus 52 is located in the target focus plane 70. If the measurement light focus 52 is supposed to be located somewhat outside the reflecting interface layer 66, then an offset to a signal 76, 78 may be given or a signal 76, 78 may be more or less amplified. The zero crossing 84 hereby displaces in the z-direction. If the relation of the offset or amplification to the displacement is known, then the target focus plane 70 may be correspondingly adjusted around the interface 66 without the autofocus method described in regard to FIGS. 7 and 8 having to be changed. The corresponding adjustment of the detector 44 may be carried out as a calibration prior to an autofocus method or during the autofocus method upon appropriate instruction by the control means 10.

After the adjustment or setting of the focus position, the light generator 14 is switched off and the focus position is regulated or maintained by means of the position signal of the actuator 38. The advantage of this is that the autofocus light pattern is not projected with the camera during the exposure. Optionally, the light generator 14 may remain switched on continuously and regulation is carried out according to the differential signal 82.

Now, images of the sample 6 or of the sample material 60 may be recorded, if need be at several z-positions. Said positions may be approached by a corresponding control of the actuator 38. It is also possible to reach these via a signal shift of one or both signals 76, 78.

To record several images of a large sample 6, said sample is moved in the x-y direction 88, i.e., perpendicular to the s-axis or the optical axis 20, as indicated in FIG. 9. The focusing may be retained in the process. However, if the sample 6 is oblique, the measurement light focus 52 slips by a distance 90 in z-direction within the sample 6. In order to identify this, the signals 76, 78 are checked for plausibility at the new x-y position. If the signals 76, 78 do not meet expectations, i.e., they are outside limit values, rough locating of the target focus plane 70 is initiated as described with regard to FIG. 7. If the signals 76, 78 are acceptable, it is possible to start directly with regulation, e.g., to the zero crossing 84.

FIG. 10 shows a projection of a light source pattern on a resting oblique sample 6. On the basis of a single autofocus point of light, it is not possible to detect whether the sample 6 is oblique in relation to the optical axis 20. However, if the measurement light focus 52 includes several focus points 92, e.g., in that a light pattern is projected onto several focus points 92 in the sample, reflections from every focus point 92 may be analyzed separately via respectively at least two light paths, as described above. In this way, it is possible to identify that the respectively located target focus planes are not identical to the individual focus points 92. An error signal may be output so that the sample 6 is again inserted in a straight manner into its mount.

FIG. 11 and FIG. 12 show alternative detection schemes, which use two optical paths that are not separated in the optical system 22. In FIG. 11 a beam is first separated in the detection path after the optical system 22 and before the detectors 72, 74 by means of a semi-transparent mirror 94. Using two apertures 46, which are arranged asymmetrically to the mirror 94 in front of the detectors 72, 74, the distance signal of the slightly different paths is detected. The asymmetry is illustrated by the different distances 96, 98 of the apertures 46 perpendicular to the mirror 94.

In FIG. 12 the light generator 14 emits rays with two different frequencies ($\lambda_1$, $\lambda_2$), which are separated in front of the detectors 72, 74 by means of a dichroic mirror 200. The distance signal is generated in turn with the aid of the apertures 46. In this case, the apertures 46 may be arranged symmetrically to the dichroic mirror 100 if the index of refraction of the optical system 22 adequately spatially separates the light paths of the different frequencies, as depicted in FIG. 12 by the distances of the two light paths in front of the mirror 100.

Also in the exemplary embodiments in FIG. 11 and FIG. 12, a selection of the light from different light paths according to the optical path length is rendered possible by an optical means, in these cases the semi-transparent mirror 94 or dichroic mirror 100. Similarly, a selection of the light from different light paths is made possible according to different directions towards the detector elements 72, 74.

FIG. 13 shows a schematic representation of e.g., an optical imaging system 102 designed as a microscope, which is directed at a sample 106 located on a specimen stage 104. The optical imaging system 102 includes a light source 108, whose beams of light are directed at the sample 106 in an optical path (indicated by a solid arrow 110) with the aid of an optical system 112 and a dichroic mirror 114. The optical system 112 includes an objective 116, which is movable with the aid of an actuator 18 relative to a microscope housing 120 along the optical axis 122 of the optical path for focusing the sample 106.

A ray reflected or scattered by the sample 106 is directed in an optical path (indicated with a dashed arrow) through the dichroic mirror 114 and optical elements 124 (indicated only generally) of the optical system 112 into a camera 126, which features a detector 128 with a light filter 130. The detector 128 includes a plurality of detector elements 132 arranged in a two-dimensional matrix, which are designed as CCD elements and attached on a chip. The light filter 130 is a spectral filter with several filter areas 134 that are different in terms of spectral filtering, which are also arranged on the chip and in the optical path directly in front of the detector elements 132.

The specimen stage 104 and along with it the sample 106 are movable with the aid of an actuator 136 perpendicularly to the optical axis 122 of the objective 116, as indicated by arrows 138, so that several shots of the sample 106 may be taken in different positions of the sample 106 in relation to the microscope 102. The actuator 136 may be triggered by a control means 140 of the microscope 12 in such a way that a travel distance of the sample 106 from shot to shot may be adjusted to a predetermined value or a value calculated by the control means. The control means 140 may also be the control means 140 of the camera 126 or an additional control means of the microscope 102 outside of the camera 126.

Because of the control means 140, an actuator 142 of the light filter 130 and/or an actuator 144 of the detector 128 may be triggered as an alternative or in addition to the actuator 136 so that the filter areas 134 and/or the detector elements 132 may be triggered and are movable relative to the optical system 112 perpendicular to the optical axis 122 of the optical path incident in the camera 126. An image of an object of the sample 16 may migrate hereby in one or more ways via the light filter 130 and/or detector 128.

An alternative embodiment of a detector 146 with several detector regions 148, 150, 12 is shown in FIG. 14. The following description is limited essentially to the differences from the exemplary embodiment in FIG. 13, to which reference is made with respect to features and functions that remain the same. Components that are essentially unchanged are identified in principle by the same reference numbers, and features that are not mentioned are adopted without describing them again.

Two dichroic beam splitters 154, 156 direct a ray reflected by the sample 6 divided by three spectral ranges to detector regions 148, 150, 152. The detector regions 148, 150, 152 are respectively sensitive in only one of the spectral ranges or are more sensitive than in the other spectral ranges. Arranged respectively in front of every detector region 148, 150, 152 is a filter area 158, 160, 162, wherein the filter areas 158, 160, 162 are only transparent in one of the spectral ranges or are more transparent than in the other spectral ranges. Their transparency is adjusted spectrally to the respective detector region 148, 150, 152 allocated to them. One or all of the filter areas 158, 160, 162 may be divided in turn into sub-areas that are different in terms of spectral filtering, as shown in FIG. 14. Because of the division into detector regions 148, 150, 152 that are different in terms of spectral sensitivity and that have respective filter areas 158, 160, 162 that are different in terms of spectral filtering, an especially high light yield may be achieved over a wide spectral range.

FIGS. 15-18 respectively depict the image of a sample 106, the 3×10 sample receptacles 164, which also may represent sample surfaces; even considerably greater numbers are conceivable containing respectively the same or different sample substances. The sample receptacles 164 are arranged in a rectangular matrix and fastened on the specimen stage 104. The to-be-examined objects 166 are located in the sample substance. The sample 106 shows an image pattern in its entirety and in its objects.

The detector 128 and its 11×15 rectangular detector elements 132 are depicted with dashed lines for the sake of clarity, whereas the light filter 130 with its 5 strip-shaped filter areas 134 is depicted with solid lines. The strips of the filter areas 134 are arranged perpendicularly to the movement direction of the specimen stage, which is depicted by an arrow 138. To better differentiate the lines, the image of the sample is depicted by dashed-and-dotted lines.

Figure 15:
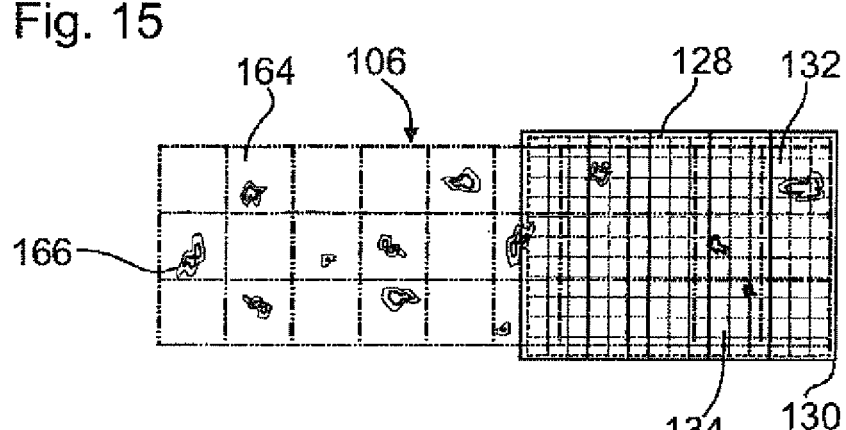
Figure 16:
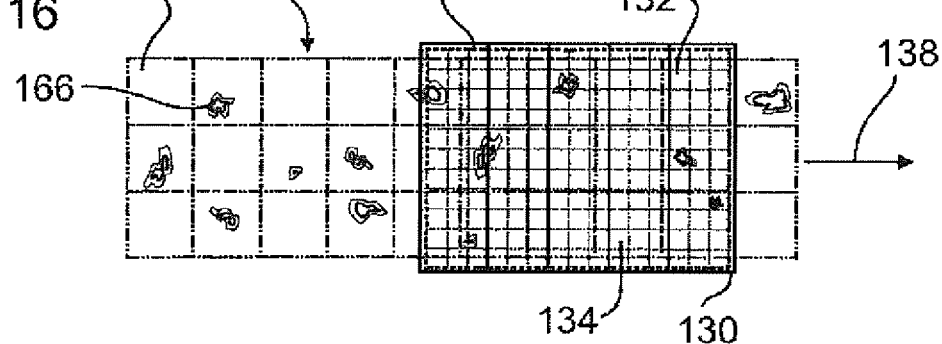

FIG. 15 shows the detector 128 and the image of the sample 106 in a position relative to each other, in which an image is being made of the sample 106, but not the first one as explained in the following. The image represents an image section having five image areas, in which twelve sample receptacles 164 including content are depicted completely and three sample receptacles 164 are depicted only partially. Three sample receptacles 164 are respectively depicted by a filter area 134 and therefore are in its spectral range. A filter area 134 depicts respectively one of five image areas of the image section. Each filter area 134 and each image area in this case overlaps precisely three detector elements 132 perpendicularly to the direction of movement of the sample 106, expressed more generally: precisely an equal number of detector elements 132.

For a next image, the image of the sample 106 is moved further by the distance of the width of the filter areas 134, wherein the width is viewed in the direction of the movement of the sample 106. Now another image section of the sample 106 is taken, wherein this image section covers another sample section and other objects 166. The position of the filter areas 134 in the image sections remains the same, but not relative to the sample sections and objects 166. With the second image, the sample receptacles 164 that are depicted again are depicted in another spectrum, i.e., in another color.

FIG. 17 shows the sample 106 offset in turn by the width of the filter areas 134 so that the sample receptacles that have now been depicted three times are depicted in three different spectra. In this manner, all areas of the sample 106 and all sample receptacles 164 are depicted at least as often as there are filter areas 134, at least five times in the exemplary embodiment shown, so that each sample area is recorded in five spectra. A five-color image can be assembled for each sample area from these five images. In order to depict every sample area five times, in the first shot the sample 106 is only recorded by one filter area 134, in the second shot by two filter areas 134, etc. Therefore, FIG. 15 shows the fifth shot of the sample 106.

The sample 106 is depicted in its entirety, in that the sample 106 is depicted image-section-by-image-section on the detector 128 and several partially overlapping images of the sample 106 and the objects 166 are made. In this case, at least as many images as there are different filter sections 134 are taken. A multi-color image of the sample 106 or of an object 166 is respectively generated, e.g., by the control means 140, from as many overlapping images as there are different filter sections 134.

The shots are evaluated in this case by an evaluation means, which may be the control means 140, which is connected to the detector 128 by signals. This process identifies when an object 168 is of special importance and should be depicted in high resolution. If this requirement is detected, then the sample 106 is moved from one shot to the next by only less than one pixel length, i.e., the length of a detector element 132, as FIG. 18 shows in comparison to the FIG. 17. In this case the object is moved from shot to shot subpixel-by-subpixel over a boundary between two filter areas 134. A resolution may be achieved from the shots in the area, which was run over by the boundary, which lies in the subpixel range so that the object 168 may be depicted in especially high resolution.

As an alternative to a movement of the sample 106 to the microscope 102, the light filter 130 and/or the detector 128 may be moved relative to the sample 106 and for example relative to the microscope housing 120.

In a further embodiment, the charge of the individual detector elements within a filter area may be displaced with the image of the sample detector element-by-element and read out only after one or more displacements. Or the charges that are allocated to a sample position during the displacement of the sample image within a filter area may be assigned a pixel spectral value. In this way, the charge generated by the light may be accumulated by the sample over a longer time.

FIG. 19 shows a double diagram in which the filter surface of a light filter 170 is depicted in the x-direction and y-direction.

The z-direction is the direction of the optical axis 122 at the entrance to the camera 126. In addition, the absorption A of the light filter 170 is depicted. The higher the transmission of the light filter 170, the smaller the absorption A. In the hatched area, the absorption is ideally close to 100% and the light filter 170 is not transparent. The light filter 170 is a cut-off filter with an edge 172 with a specific wavelength X. The wavelength X is a function of the position of the edge 172 in the x-direction of the filters 170. The wavelength X of the edge 172 is higher further to the right in the filter than further to the left. In the depicted example, the change of the wavelength of the edge per distance of the light filter is constant in the x-direction. Other relations with linear or non-linear changes are also conceivable. In the case of the light filter 170, a great many or infinite numbers of filter areas that are different in terms of spectral filtering are located very close or infinitely close side by side.

When using the light filter 170 instead of the light filter 130 in FIGS. 15-18, each sample area may be depicted as often as required in different spectra so that a spectral resolution of the overall image of the sample 106 is dependent on the path of movement of the sample 106 from shot to shot. In this way, the spectral resolution of the overall image may be freely selected.

If two cut-off filters 174, 176 with an opposing edge profile are arranged in succession, as shown in FIG. 20, a transmission window 178 may be adjusted both in its spatial expansion $\Delta x$ as well as in its spectral expansion $\Delta \lambda$ by a movement of the cut-off filters 174, 176 against each other. Spectral ranges may be excluded and a spectral resolution may be adjusted.

Adapting the light filter 130 to the detector 128 is shown in FIG. 21. In FIG. 21 a graph of the sensitivity E of the detector 128 is plotted over the wavelength $\lambda$ of the registered light. The sensitivity E is a function of the wavelength $\lambda$ of the light and is less by a wavelength $\lambda_1$ than by a wavelength $\lambda_2$. In order to achieve the most uniform possible exposure of the shots of the sample 106 over the entire relevant spectral range, the transmissive filter area 134 of the light filter 130 on wavelength $\lambda_1$ is transmissive in a greater wavelength range $\Delta \lambda_1$ than the transmissive filter area 134 of the light filter 130 on wavelength $\lambda_2$, which is transmissive only in a smaller wavelength range $\Delta \lambda_2$.

Another possibility for achieving the most uniform possible exposure of the shots of the sample 106 over the entire relevant spectral range is undertaking an electronic adaptation of the detector elements 132 on the filter area 134 located in front of it. In the case of a less transmissive filter area 134, a detector element 134 allocated to this filter area 134 may be triggered in a different manner than a detector element 132, which is allocated to a higher transmissive filter area 134. The different triggering may be achieved by a different adjustment of the gain and/or the integration time of the detector elements 312. A pixel binning, i.e., combining two or more pixels or detector elements 132, is conceivable, just like a subsampling, i.e., a reading out of only every $n^{th}$ detector element 132, with n=1, 2, 3, etc. The corresponding control may be undertaken by the control means 140.

In an especially advantageous exemplary embodiment, in the case of the electronic adjustment of the detector elements 132, a displacement of the filter areas 134 in front of the detector elements 132 is taken into consideration. To this end, the position of the light filter 130 in relation to the detector 128 must be known, e.g., through position signals from one of the actuators 142, 144.

REFERENCE NUMBERS

2 Autofocus device
4 Microscope
6 Sample
8 Image detector
10 Control means
12 Light source
14 Light generator
16 Optics
18 Diaphragm
20 Optical axis 22 Optical system
24 Optical element
26 Objective
28 Means
30 Beam splitter
32 Beam splitter
34 Microscope housing
36 Optical element
38 Actuator
40 Optics
42 Optics
44 Detector
46 Aperture
48 Light path
50 Light path
52 Measurement light focus
54 Distance
56 Focus
58 Specimen slide
60 Sample material
62 Cover slip
64 Interface
66 Interface
68 Interface
70 Target focus plane
72 Detector element
74 Detector element
76 Signal
78 Signal
80 Position
82 Differential signal
84 Zero crossing
86 Target position
88 Direction
90 Distance
92 Focus point
94 Mirror
96 Distance
98 Distance
100 Mirror
102 Microscope
104 Specimen stage
106 Sample
108 Light source
110 Arrow
112 Optical system
114 Mirror
116 Objective
118 Actuator
120 Microscope housing
122 Optical axis
124 Optical elements
126 Camera
128 Detector
130 Light filter
132 Detector element
134 Filter area
136 Actuator
138 Arrow
140 Control means
142 Actuator
144 Actuator
146 Detector
148 Detector region
150 Detector region
152 Detector region
154 Mirror
156 Mirror
158 Filter area
160 Filter area
162 Filter area
164 Sample receptacle
166 Object
168 Object
170 Light filter
172 Edge
174 Cut-off filter
176 Cut-off filter
178 Transmission window
A Absorption
E Sensitivity
λ Wavelength
Δλ Wavelength range
A Amplitude
g Limit value
t Time
z Direction of the optical axis

The invention claimed is:

1. An autofocus method, in which light from a light source is focused at a measurement light focus in a sample and is reflected from there and the reflected light is guided through an optical system in two light paths onto at least two detector elements,
characterized in that the measurement light focus is moved in layers of the sample which reflect light to different extents and the reflected light is guided through at least one aperture, which is arranged outside an optical axis of the optical system and which corresponds in terms of its shape to the light source, and the detector elements are arranged in such a way that profiles of a radiation property registered by the detector elements are different from each other and a focus position is set in a manner dependent on the profiles.

2. The method of claim 1,
characterized in that light from both light paths that is reflected from the measurement light focus strikes the detector elements to an equal extent.

3. The method of claim 1,
characterized in that light that is reflected from above or below the measurement light focus strikes the detector elements to an unequal extent.

4. The method of claim 1,
characterized in that a selection of light reflected from different interface layers is carried through an optical system according to different optical path lengths.

5. The method of claim 1,
characterized in that a selection of light reflected from different interface layers is carried through an optical system according to different directions towards the detector elements.

6. The method of claim 1,
characterized in that the light paths are separated from each other by a shaded area.

7. The method of claim 1,
characterized in that the light in the light paths has different spectral properties and the light paths are separated in front of the detector elements according to the spectral properties.

8. The method of claim 1,
characterized in that the profiles are detected continuously.

9. The method of claim 1,
characterized in that a focus of the optical system is adjusted such that signals of the detector elements are in a fixed ratio to one another and are equally strong.

10. The method of claim 1, characterized in that the measurement light focus is adjusted on an interface layer reflecting light and afterwards the sample is moved perpendicularly to the optical axis of the optical system and the signals of the detector elements are subsequently checked for being within limit values with respect to a rough adjustment in effect on the reflecting interface layer.

11. The method of claim 1, characterized in that the light source has a light pattern, which is projected in the sample, wherein reflected light from several pattern points of the light pattern is detected in the two light paths.

12. The method of claim 11, characterized in that a tilting of a reflecting interface layer is detected from several target positions of the several pattern points.

13. The method of claim 1, wherein the at least one aperture has the same shape as the shape of the light source.

14. The method of claim 1, wherein the aperture has a circular shape.

15. The method of claim 1, wherein the aperture has a punctiform shape.

16. The method of claim 1, wherein the at least one aperture makes it possible to select from one or both of the two light paths according to an optical path length.

17. The method of claim 1, wherein the at least one aperture makes it possible to select from one or both of the two light paths because of their different directions.

18. An autofocus method comprising focusing at least two beams of light from a light source at a measurement light focus in a sample, wherein the at least two beams of light are reflected from the measurement light focus and the reflected light is guided through an optical system from two light paths onto at least two detector elements,
wherein the measurement light focus of the two beams is moved in layers of the sample which reflect light to different extents and the reflected light is guided through at least one aperture, which is arranged outside an optical axis of the optical system and the at least one aperture corresponds in terms of its shape to the light source, and the detector elements are arranged in such a way that profiles of a radiation property registered by the detector elements are different from each other and a focus position is set in a manner dependent on the profiles.

19. The method of claim 18, characterized in that light that is reflected from above or below the measurement light focus strikes the detector elements to an unequal extent; and characterized in that a selection of light reflected from different interface layers is carried through an optical system according to different optical path lengths.

20. The method of claim 18, wherein the detector elements are arranged in such a way that profiles of a radiation property registered by the detector elements are different from each other depending on distances above and below the set focus position that the reflected light is reflected from.

* * * * *